US012401860B2

(12) United States Patent
Mendell

(10) Patent No.: US 12,401,860 B2
(45) Date of Patent: Aug. 26, 2025

(54) SYSTEMS AND METHODS FOR PROVIDING NOTIFICATIONS OF CRITICAL EVENTS OCCURRING IN LIVE CONTENT BASED ON ACTIVITY DATA

(71) Applicant: DK Crown Holdings Inc., Boston, MA (US)

(72) Inventor: Jordan Mendell, Boca Raton, FL (US)

(73) Assignee: DK Crown Holdings Inc., Boston, MA (US)

( * ) Notice: Subject to any disclaimer, the term of this patent is extended or adjusted under 35 U.S.C. 154(b) by 136 days.

(21) Appl. No.: 17/953,105

(22) Filed: Sep. 26, 2022

(65) Prior Publication Data

US 2023/0135514 A1    May 4, 2023

Related U.S. Application Data

(63) Continuation of application No. 17/516,134, filed on Nov. 1, 2021, now Pat. No. 11,457,285.
(Continued)

(51) Int. Cl.
*H04N 21/488* (2011.01)
*G07F 17/32* (2006.01)
(Continued)

(52) U.S. Cl.
CPC ..... *H04N 21/4882* (2013.01); *G07F 17/3211* (2013.01); *G07F 17/3237* (2013.01);
(Continued)

(58) Field of Classification Search
CPC ........... H04N 21/4882; H04N 21/2187; H04N 21/4316; H04N 21/478; H04N 21/8133;
(Continued)

(56) References Cited

U.S. PATENT DOCUMENTS 5,830,068 A    11/1998    Brenner et al.
6,735,487 B1    5/2004    Marshall et al.
(Continued)

FOREIGN PATENT DOCUMENTS

AU    2003100117 A4    7/2003
EP    1 484 723 A2    12/2004
EP    4 024 322 A1    7/2022

OTHER PUBLICATIONS

Non-Final Office Action on U.S. Appl. No. 17/947,444 dated Oct. 11, 2023.
(Continued)

*Primary Examiner* — Ngoc K Vu
(74) *Attorney, Agent, or Firm* — Foley & Lardner LLP

(57) ABSTRACT

The present disclosure provides live event systems having one or more processors coupled to memory. The live event system can access a plurality of messages associated with a live event broadcasted to a plurality of broadcast receiver devices via a broadcast provider system. The live event system can determine that at least one message of the messages satisfies a condition of a notification generation policy relating to the live event. The live event system can identify, from the broadcast receiver devices, a subset of broadcast receiver devices that satisfy a notification transmission policy relating to the live event. The live event system can transmit instructions to the broadcast provider system, instructions causing the broadcast provider system to communicate with each broadcast receiver device of the subset of broadcast receiver devices and cause each broadcast receiver device of the subset to display a notification identifying the live event.

20 Claims, 11 Drawing Sheets

Related U.S. Application Data

(60) Provisional application No. 63/273,580, filed on Oct. 29, 2021.

(51) Int. Cl.

| | | |
|---|---|---|
| *H04N 21/2187* | (2011.01) | |
| *H04N 21/235* | (2011.01) | |
| *H04N 21/258* | (2011.01) | |
| *H04N 21/262* | (2011.01) | |
| *H04N 21/414* | (2011.01) | |
| *H04N 21/431* | (2011.01) | |
| *H04N 21/45* | (2011.01) | |
| *H04N 21/458* | (2011.01) | |
| *H04N 21/475* | (2011.01) | |
| *H04N 21/478* | (2011.01) | |
| *H04N 21/6543* | (2011.01) | |
| *H04N 21/6547* | (2011.01) | |
| *H04N 21/81* | (2011.01) | |

(52) U.S. Cl.
CPC ..... *G07F 17/3288* (2013.01); *H04N 21/2187* (2013.01); *H04N 21/2353* (2013.01); *H04N 21/25808* (2013.01); *H04N 21/26208* (2013.01); *H04N 21/2625* (2013.01); *H04N 21/41407* (2013.01); *H04N 21/4316* (2013.01); *H04N 21/4518* (2020.08); *H04N 21/4524* (2013.01); *H04N 21/4532* (2013.01); *H04N 21/458* (2013.01); *H04N 21/4753* (2013.01); *H04N 21/478* (2013.01); *H04N 21/6543* (2013.01); *H04N 21/6547* (2013.01); *H04N 21/8126* (2013.01); *H04N 21/8133* (2013.01)

(58) Field of Classification Search
CPC ............. H04N 21/4532; H04N 21/458; H04N 21/25841; H04N 21/2625; H04N 21/2353; H04N 21/41407; H04N 21/4518; H04N 21/6547; H04N 21/8126; H04N 21/25808; H04N 21/25891; H04N 21/4524; H04N 21/4753; H04N 21/6543; H04N 21/26208; G07F 17/3211; G07F 17/3237; G07F 17/3288

See application file for complete search history.

(56) References Cited

U.S. PATENT DOCUMENTS

| | | | |
|---|---|---|---|
| 7,904,924 B1 | 3/2011 | Heer et al. | |
| 8,538,563 B1 | 9/2013 | Barber | |
| 10,664,138 B2 | 5/2020 | Carney et al. | |
| 11,190,736 B2 | 11/2021 | Kawakami et al. | |
| 11,217,067 B1 | 1/2022 | Huke et al. | |
| 11,457,285 B1* | 9/2022 | Mendell | H04N 21/25841 |
| 2002/0054068 A1 | 5/2002 | Ellis et al. | |
| 2002/0174430 A1 | 11/2002 | Ellis et al. | |
| 2005/0005291 A1 | 1/2005 | McGinley | |
| 2007/0157281 A1 | 7/2007 | Ellis et al. | |
| 2008/0066111 A1 | 3/2008 | Ellis et al. | |
| 2008/0112690 A1 | 5/2008 | Shahraray et al. | |
| 2008/0148317 A1 | 6/2008 | Opaluch | |
| 2008/0182651 A1 | 7/2008 | Marshall et al. | |
| 2009/0082095 A1 | 3/2009 | Walker et al. | |
| 2009/0133051 A1 | 5/2009 | Hildreth | |
| 2009/0158374 A1 | 6/2009 | Malaure et al. | |
| 2009/0183178 A1 | 7/2009 | Imai et al. | |
| 2009/0288118 A1 | 11/2009 | Chang | |
| 2010/0041482 A1 | 2/2010 | Kumar et al. | |
| 2010/0058423 A1 | 3/2010 | Yaussy et al. | |
| 2010/0144426 A1 | 6/2010 | Winner et al. | |
| 2010/0262986 A1 | 10/2010 | Adimatyam et al. | |
| 2011/0022471 A1 | 1/2011 | Brueck et al. | |
| 2011/0069940 A1 | 3/2011 | Shimy et al. | |
| 2011/0078717 A1 | 3/2011 | Drummond et al. | |
| 2011/0086699 A1 | 4/2011 | Allen et al. | |
| 2012/0033943 A1 | 2/2012 | Klappert et al. | |
| 2012/0162515 A1 | 6/2012 | Lee et al. | |
| 2013/0002716 A1 | 1/2013 | Walker et al. | |
| 2013/0013625 A1* | 1/2013 | Yoshida | G06F 16/48 |
| | | | 707/E17.119 |
| 2013/0027613 A1 | 1/2013 | Kim et al. | |
| 2013/0173765 A1 | 7/2013 | Korbecki | |
| 2013/0179925 A1 | 7/2013 | Woods et al. | |
| 2013/0225298 A1 | 8/2013 | Hamlin et al. | |
| 2013/0247120 A1 | 9/2013 | Milgramm | |
| 2013/0282421 A1 | 10/2013 | Graff et al. | |
| 2014/0036152 A1 | 2/2014 | Jackson et al. | |
| 2014/0062696 A1 | 3/2014 | Packard et al. | |
| 2014/0068692 A1 | 3/2014 | Archibong et al. | |
| 2014/0129570 A1 | 5/2014 | Johnson | |
| 2014/0130079 A1 | 5/2014 | Arora et al. | |
| 2014/0201769 A1 | 7/2014 | Neumeier et al. | |
| 2014/0282721 A1 | 9/2014 | Kuncl et al. | |
| 2014/0372876 A1 | 12/2014 | Bliss et al. | |
| 2015/0070516 A1 | 3/2015 | Shoemake et al. | |
| 2015/0163547 A1 | 6/2015 | Whitten | |
| 2015/0172338 A1 | 6/2015 | Moran et al. | |
| 2016/0088352 A1 | 3/2016 | Agarwal et al. | |
| 2016/0227281 A1 | 8/2016 | Abuelsaad et al. | |
| 2016/0337702 A1 | 11/2016 | Klappert et al. | |
| 2017/0034594 A1 | 2/2017 | Francis et al. | |
| 2017/0064378 A1 | 3/2017 | Webster et al. | |
| 2017/0064396 A1 | 3/2017 | Yun et al. | |
| 2017/0070769 A1 | 3/2017 | Bostick et al. | |
| 2018/0048936 A1 | 2/2018 | Gupta et al. | |
| 2018/0060439 A1 | 3/2018 | Kula et al. | |
| 2018/0108380 A1 | 4/2018 | Packard et al. | |
| 2018/0214772 A1 | 8/2018 | Walsh | |
| 2019/0205839 A1 | 7/2019 | Dotan-Cohen et al. | |
| 2019/0236905 A1 | 8/2019 | Washington et al. | |
| 2019/0262721 A1 | 8/2019 | Macinnes et al. | |
| 2019/0268663 A1 | 8/2019 | Fischer | |
| 2019/0349638 A1 | 11/2019 | Baek et al. | |
| 2019/0362601 A1 | 11/2019 | Kline et al. | |
| 2019/0384469 A1 | 12/2019 | Lo et al. | |
| 2020/0077138 A1 | 3/2020 | Sawyer et al. | |
| 2020/0213678 A1 | 7/2020 | Pleiman | |
| 2020/0245017 A1 | 7/2020 | Ganschow et al. | |
| 2020/0252664 A1 | 8/2020 | Weinraub | |
| 2020/0294364 A1 | 9/2020 | Nelson et al. | |
| 2020/0357246 A1 | 11/2020 | Nelson et al. | |
| 2021/0031105 A1* | 2/2021 | Ganschow | G06T 11/00 |
| 2021/0076099 A1 | 3/2021 | Ganschow et al. | |
| 2021/0217269 A1 | 7/2021 | Huke et al. | |
| 2021/0256797 A1 | 8/2021 | Huke et al. | |
| 2022/0103905 A1 | 3/2022 | Montgomery et al. | |
| 2022/0114339 A1* | 4/2022 | Aher | H04L 12/1813 |
| 2022/0157127 A1 | 5/2022 | Tadepalli et al. | |
| 2022/0309873 A1 | 9/2022 | Russ et al. | |
| 2022/0321951 A1 | 10/2022 | Chandrashekar et al. | |
| 2022/0377427 A1 | 11/2022 | Montgomery et al. | |

OTHER PUBLICATIONS

Notice of Allowance on U.S. Appl. No. 17/943,930 dated Oct. 17, 2023.

Final Office Action on U.S. Appl. No. 17/516,150 dated May 27, 2022.

Non-Final Office Action on U.S. Appl. No. 17/516,150 dated Jan. 28, 2022.

Non-Final Office Action on U.S. Appl. No. 17/516,134 dated Feb. 1, 2022.

Non-Final Office Action on U.S. Appl. No. 17/516,197 dated Jan. 13, 2022.

Non-Final Office Action on U.S. Appl. No. 17/516,200 dated Dec. 21, 2021.

Notice of Allowance on U.S. Appl. No. 17/516,134 dated Jun. 6, 2022.

Notice of Allowance on U.S. Appl. No. 17/516,197 dated May 6, 2022.

(56) References Cited

OTHER PUBLICATIONS

Notice of Allowance on U.S. Appl. No. 17/516,200 dated Apr. 27, 2022.
Non-Final Office Action on U.S. Appl. No. 17/976,130 dated Sep. 14, 2023.
Notice of Allowance on U.S. Appl. No. 17/516,150 dated Sep. 21, 2023.
Non-Final Office Action on U.S. Appl. No. 17/976,107 dated Jan. 5, 2024.
Non-Final Office Action on U.S. Appl. No. 17/976,141 dated Nov. 29, 2023.
Notice of Allowance on U.S. Appl. No. 17/976,097 dated Nov. 7, 2023.
Notice of Allowance on U.S. Appl. No. 17/976,130 dated Jan. 26, 2024.
Final Office Action on U.S. Appl. No. 17/516,150 dated Mar. 10, 2023.
Final Office Action on U.S. Appl. No. 17/976,097 dated Jul. 10, 2023.
Final Office Action on U.S. Appl. No. 17/976,107 dated Aug. 11, 2023.
Final Office Action on U.S. Appl. No. 17/976,130 dated Jun. 1, 2023.
Final Office Action on U.S. Appl. No. 17/976,141 dated Jul. 13, 2023.
Non-Final Office Action on U.S. Appl. No. 17/976,097 dated Mar. 2, 2023.
Non-Final Office Action on U.S. Appl. No. 17/976,107 dated Mar. 28, 2023.
Non-Final Office Action on U.S. Appl. No. 17/976,141 dated Mar. 16, 2023.
Notice of Allowance on U.S. Appl. No. 17/976,120 dated May 9, 2023.
Final Office Action on U.S. Appl. No. 17/976,107 dated May 8, 2024.
Final Office Action on U.S. Appl. No. 17/947,444 dated Apr. 3, 2024.
Final Office Action on U.S. Appl. No. 17/976,141 dated Mar. 12, 2024.
Non-Final Office Action on U.S. Appl. No. 17/516,150 dated Nov. 18, 2022.
Non-Final Office Action on U.S. Appl. No. 17/976,120 dated Jan. 25, 2023.
Non-Final Office Action on U.S. Appl. No. 17/976,130 dated Feb. 2, 2023.
Non-Final Office Action on U.S. Appl. No. 17/947,444 dated Sep. 23, 2024.
Non-Final Office Action on U.S. Appl. No. 18/398,538 dated Oct. 7, 2024.
Non-Final Office Action on U.S. Appl. No. 18/408,368 dated Sep. 12, 2024.
Notice of Allowance on U.S. Appl. No. 17/976,107 dated Sep. 3, 2024.
Notice of Allowance on U.S. Appl. No. 17/976,141 dated Jul. 17, 2024.
Notice of Allowance on U.S. Appl. No. 18/408,359 dated Aug. 5, 2024.
Final Office Action on U.S. Appl. No. 17/947,444 dated Feb. 26, 2025.
Final Office Action on U.S. Appl. No. 18/398,538 dated Mar. 20, 2025.
Notice of Allowance on U.S. Appl. No. 18/451,718 dated Mar. 14, 2025.
Non-Final Office Action on U.S. Appl. No. 18/451,718 dated Nov. 20, 2024.
Non-Final Office Action on U.S. Appl. No. 18/672,565 dated Dec. 19, 2024.
Final Office Action on U.S. Appl. No. 18/408,368 dated Apr. 3, 2025.
Final Office Action on U.S. Appl. No. 18/672,565 dated Mar. 31, 2025.
Notice of Allowance on U.S. Appl. No. 17/947,444 dated Jun. 10, 2025.
Notice of Allowance on U.S. Appl. No. 18/672,565 dated Jun. 27, 2025.

\* cited by examiner

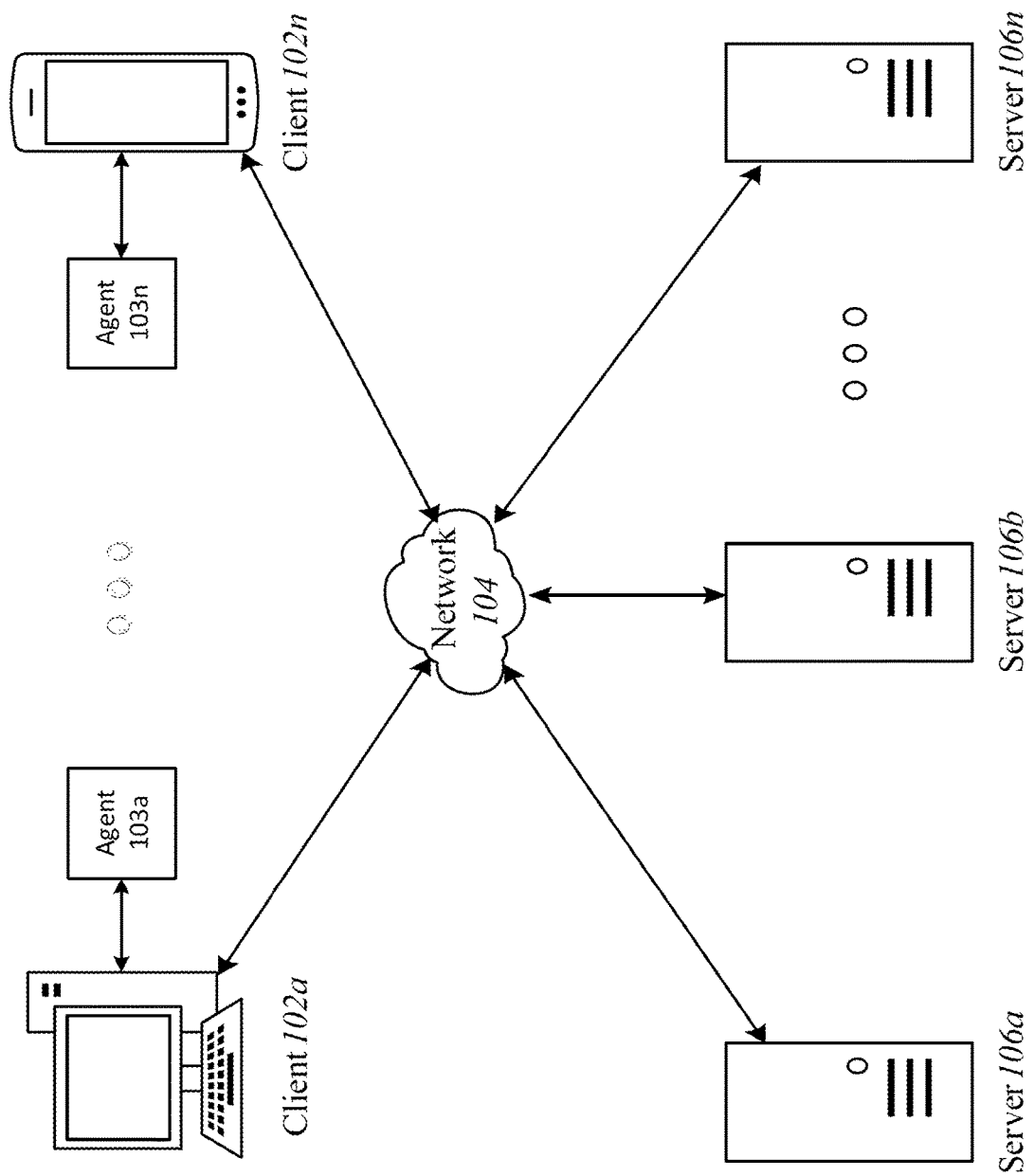

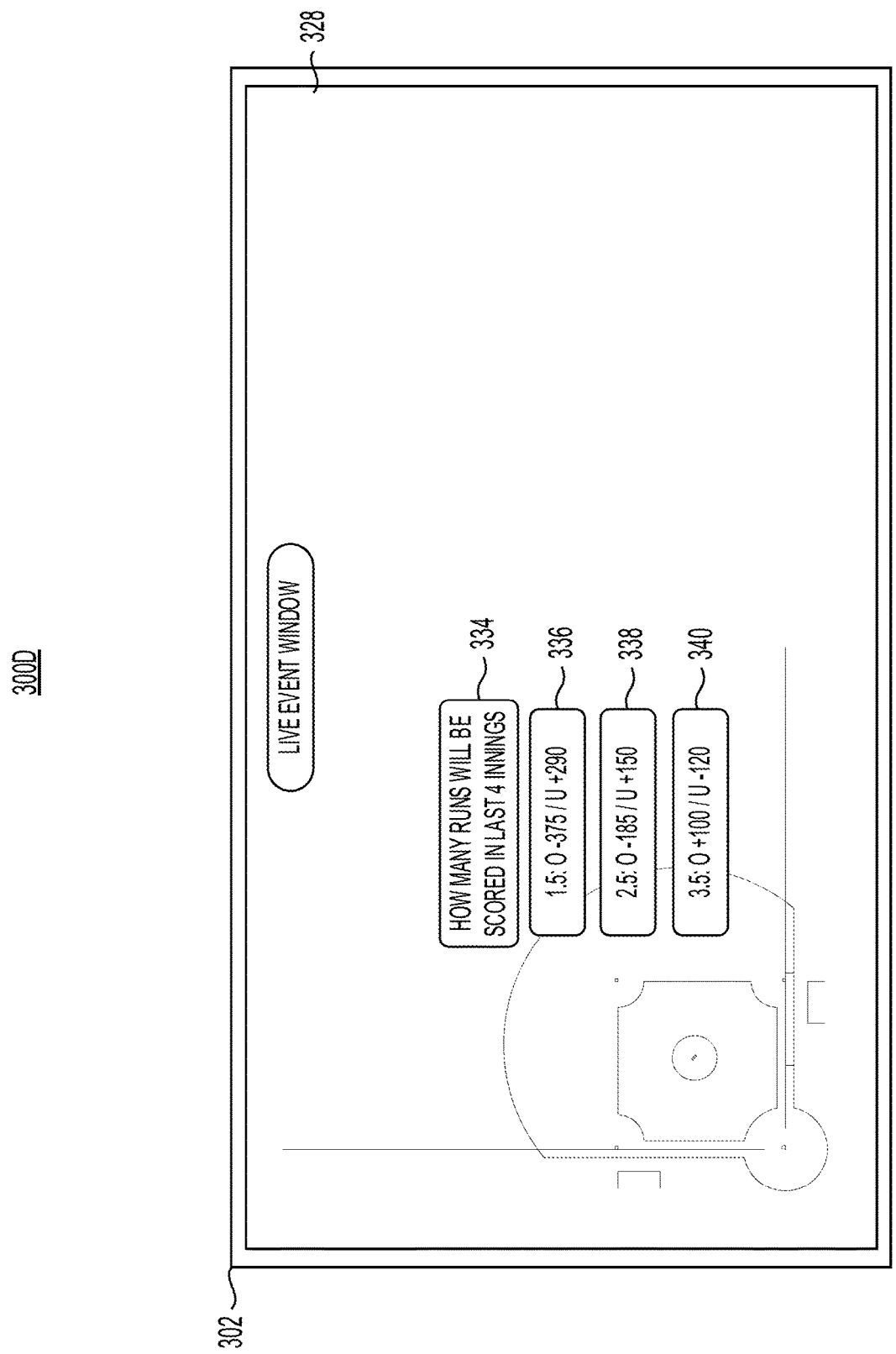

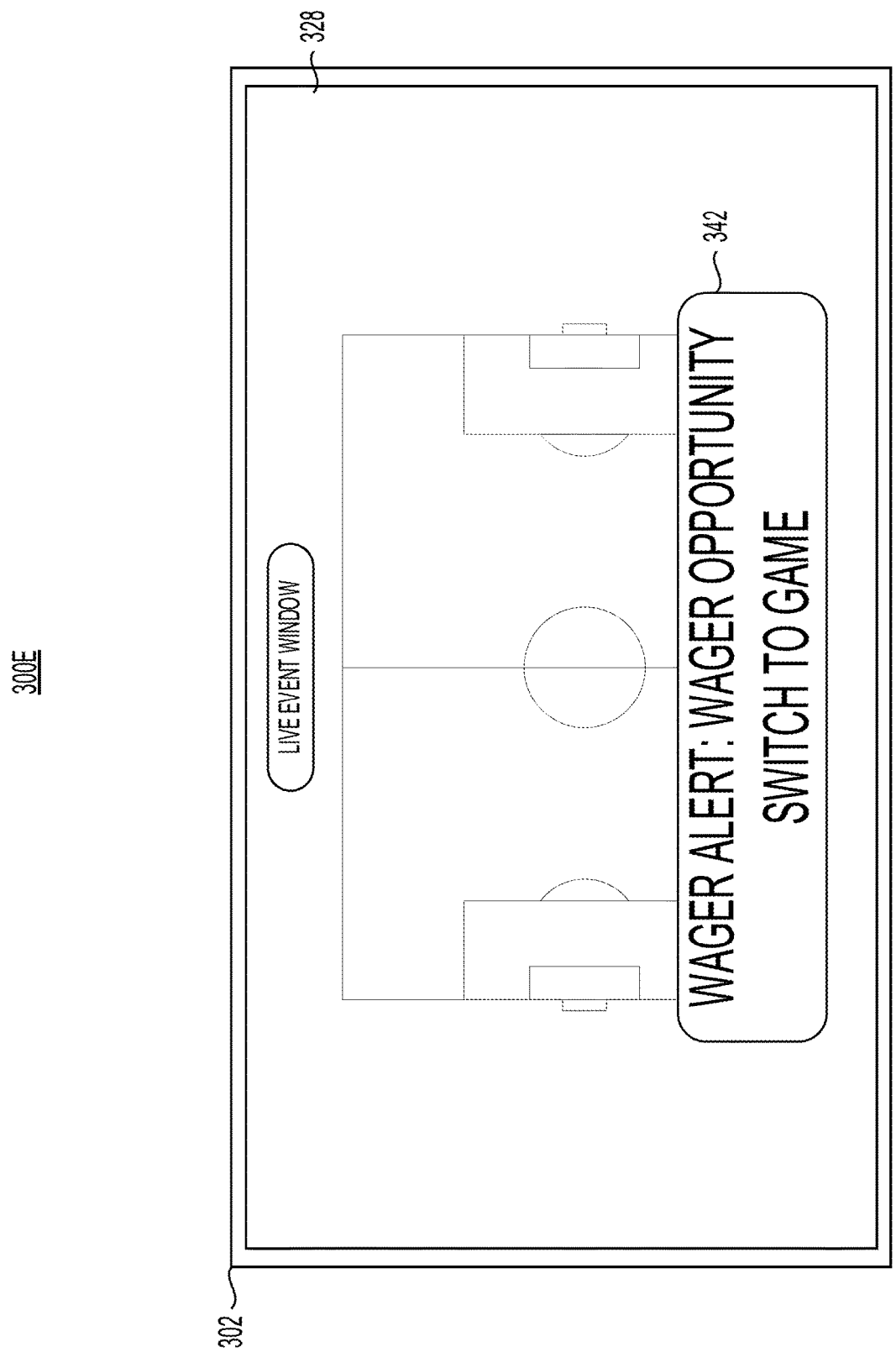

SYSTEMS AND METHODS FOR PROVIDING NOTIFICATIONS OF CRITICAL EVENTS OCCURRING IN LIVE CONTENT BASED ON ACTIVITY DATA

CROSS-REFERENCE TO RELATED APPLICATIONS

The present application claims is a continuation of and priority to U.S. application Ser. No. 17/516,134, filed Nov. 1, 2021, and titled "SYSTEMS AND METHODS FOR PROVIDING NOTIFICATIONS OF CRITICAL EVENTS OCCURRING IN LIVE CONTENT BASED ON ACTIVITY DATA," which itself claims the benefit of and priority to U.S. Provisional Patent Application No. 63/273,580, filed Oct. 29, 2021, and titled "SYSTEMS AND METHODS FOR IMPROVED MANAGEMENT OF PROCESSING BROADCAST DATA," the contents of each of which are incorporated herein by reference in their entirety for all purposes.

BACKGROUND

Broadcast devices, such as cable boxes or set-top boxes, are used to display broadcast content received from a broadcast source. Due to the one-to-many nature of broadcast content, it is challenging to monitor and display information relating to a specific broadcast device with broadcast content.

SUMMARY

It is therefore advantageous for a system to identify characteristics of a broadcast receiver device, and to display notifications, alerts, or user interfaces in connection with broadcast content displayed on the broadcast receiver device based on those characteristics. Conventional broadcast systems are incapable of providing customized or broadcast receiver device-specific information to broadcast receiver devices displaying live broadcasts, due to the one-to-many configuration of traditional broadcast systems. The systems and methods described herein can generate interactive features for display in connection with live broadcast content, for example, based on policies or characteristics of one or more particular devices. Thus, the systems and methods of this technical solution provide a technical improvement to broadcast receiver devices by providing additional, generated interactive features.

At least one aspect of the present disclosure is directed to a live event system. The live event system can include one or more processors coupled to memory. The live event system can access, from one or more content sources, a plurality of messages associated with a live event broadcasted to a plurality of broadcast receiver devices via a broadcast provider system. The live event system can determine that at least one message of the plurality of messages satisfies a condition of a notification generation policy relating to the live event. The live event system can identify, from the plurality of broadcast receiver devices, a subset of broadcast receiver devices that satisfy a notification transmission policy relating to the live event. The live event system can transmit instructions to the broadcast provider system, instructions causing the broadcast provider system to communicate with each broadcast receiver device of the subset of broadcast receiver devices and cause each broadcast receiver device of the subset to display a notification identifying the live event and corresponding to the condition of the notification generation policy.

In some implementations, the notification includes an actionable object that causes a broadcast receiver device displaying the notification to display a broadcast of the live event. In some implementations, the one or more processors can be further configured to maintain a plurality of user profiles corresponding to user consuming a service of the one or more processors, each of the plurality of user profiles associated with a respective one of the plurality of broadcast receiver devices. In some implementations, the one or more processors can be further configured to identify the subset of broadcast receiver devices further based on one or more attributes of each user profile of the plurality of user profiles.

In some implementations, the plurality of messages are a plurality of wagers, and wherein to access the plurality of messages, the one or more processors are further configured to receive the plurality of wagers that identify the live event. In some implementations, to determine that the at least one message of the plurality of messages satisfies the condition of the notification generation policy, the one or more processors can be further configured to determine that a number of the plurality of messages associated with the live event satisfies a predetermined threshold. In some implementations, to determine that the at least one message of the plurality of messages satisfies the condition of the notification generation policy, the one or more processors can be further configured to determine that a type of wager indicated in the at least one message satisfies a predetermined wager type condition.

In some implementations, to determine that the at least one message of the plurality of messages satisfies the condition of the notification generation policy, the one or more processors can be further configured to determine that the at least one message indicates a wager amount that satisfies a predetermined wager amount condition. In some implementations, the notification further includes an actionable object identifying the live event that, when actuated, causes a broadcast receiver device displaying the notification to display a second content item with a broadcast of the live event. In some implementations, the notification further includes an actionable object identifying the condition of the notification generation policy that, when actuated, causes a broadcast receiver device displaying the notification to transmit, to the one or more processors, a request to place a wager on the live event.

Various implementations relate to a method, the method implemented by one or more processors coupled to memory. The method includes accessing from one or more content sources, a plurality of messages associated with a live event broadcasted to a plurality of broadcast receiver devices via a broadcast provider system. The further method includes determining that at least one message of the plurality of messages satisfies a condition of a notification generation policy relating to the live event. The further method includes identifying from the plurality of broadcast receiver devices, a subset of broadcast receiver devices that satisfy a notification transmission policy relating to the live event. The further method includes transmitting instructions to the broadcast provider system, instructions causing the broadcast provider system to communicate with each broadcast receiver device of the subset of broadcast receiver devices and cause each broadcast receiver device of the subset to display a notification identifying the live event and corresponding to the condition of the notification generation policy.

In some implementations, the notification includes an actionable object that causes a broadcast receiver device displaying the notification to display a broadcast of the live event. In some implementations, the method further includes maintaining, by the one or more processors, a plurality of user profiles corresponding to user consuming a service of the one or more processors, each of the plurality of user profiles associated with a respective one of the plurality of broadcast receiver devices. In some implementations, identifying the subset of broadcast receiver devices is further based on one or more attributes of each user profile of the plurality of user profiles. In some implementations, the plurality of messages are a plurality of wagers, and wherein accessing the plurality of messages further includes receiving, by the one or more processors, the plurality of wagers that identify the live event.

In some implementations, determining that the at least one message of the plurality of messages satisfies the condition of the notification generation policy further includes determining, by the one or more processors, that a number of the plurality of messages associated with the live event satisfies a predetermined threshold. In some implementations, determining that the at least one message of the plurality of messages satisfies the condition of the notification generation policy further includes determining, by the one or more processors, that a type of wager indicated in the at least one message satisfies a predetermined wager type condition. In some implementations, determining that the at least one message of the plurality of messages satisfies the condition of the notification generation policy further includes determining, by the one or more processors, that the at least one message indicates a wager amount that satisfies a predetermined wager amount condition.

In some implementations, the notification further includes an actionable object identifying the live event that, when actuated, causes a broadcast receiver device displaying the notification to display a second content item with a broadcast of the live event. In some implementations, the notification further includes an actionable object identifying the condition of the notification generation policy that, when actuated, causes a broadcast receiver device displaying the notification to transmit, to the one or more processors, a request to place a wager on the live event.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 1A is a block diagram depicting an embodiment of a network environment comprising a client device in communication with a server device;

FIGS. 3A, 3B, 3C, 3D, and 3E illustrate example live event broadcasts displayed on a broadcast device depicted in FIG. 2, in accordance with one or more implementations.

DETAILED DESCRIPTION

Figure 1B:
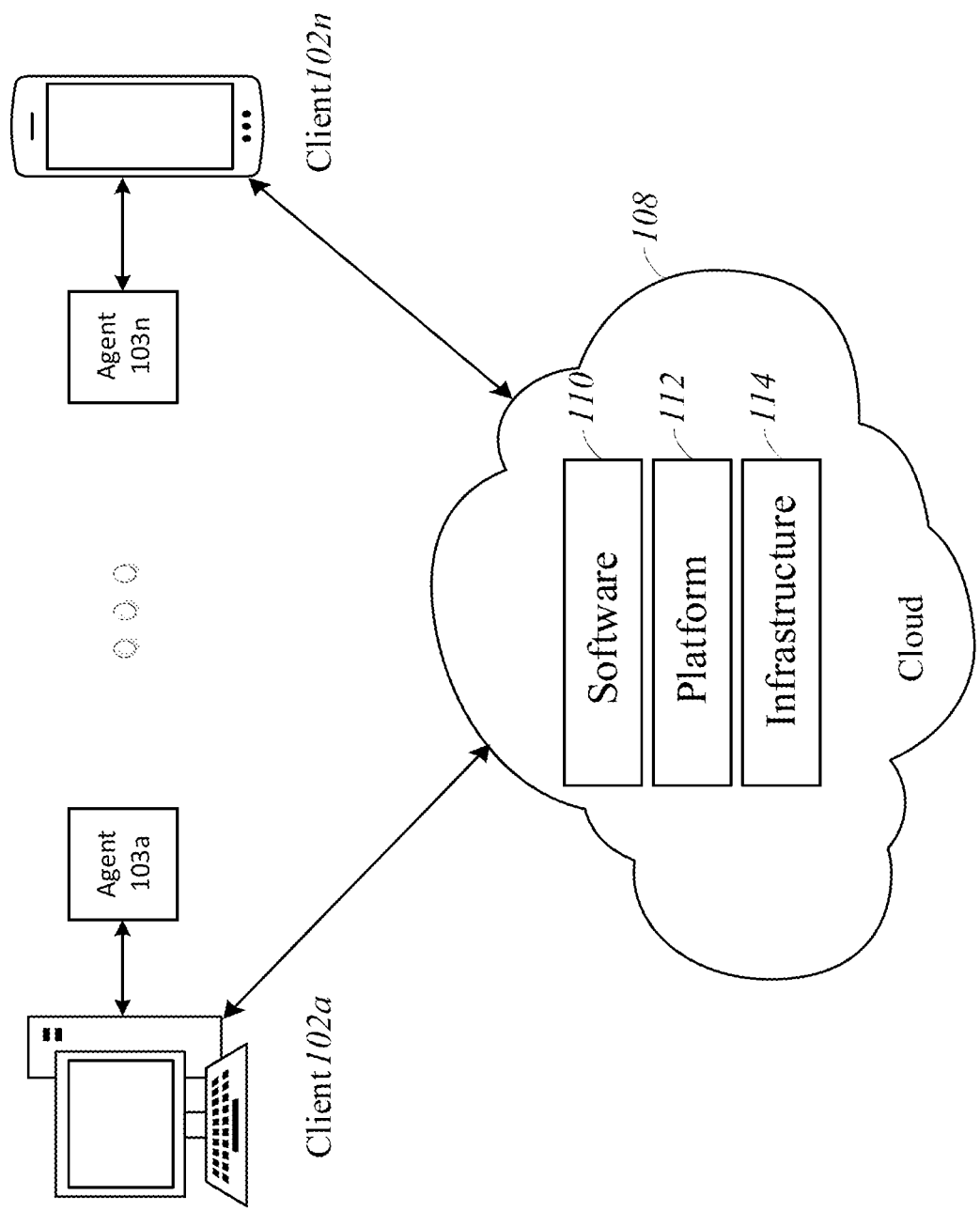
FIG. 1B is a block diagram depicting a cloud computing environment comprising a client device in communication with cloud service providers.

Below are detailed descriptions of various concepts related to, and implementations of, techniques, approaches, methods, apparatuses, and systems for providing notifications of critical events occurring in live content based on activity data. The various concepts introduced above and discussed in greater detail below may be implemented in any of numerous ways, as the described concepts are not limited to any particular manner of implementation. Examples of specific implementations and applications are provided primarily for illustrative purposes.

For purposes of reading the description of the various implementations below, the following descriptions of the sections of the Specification and their respective contents may be helpful:

Section A describes a network environment and computing environment which may be useful for practicing embodiments described herein; and Section B describes systems and methods for live event systems.

A. Computing and Network Environment

Prior to discussing specific implements of the various aspects of this technical solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more agents 103a-103n and one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 (not shown) or a machine farm 38. In another of these embodiments, the servers 106 may be geographically dispersed. In other embodiments, a machine farm 38 may be administered as a single entity. In still other embodiments, the machine farm 38 includes one or more machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Washington), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, one or more nodes 290 may be in the path between any two communicating servers.

Referring to FIG. 1B, a cloud computing environment is depicted. A cloud computing environment may provide client 102 with one or more resources provided by a network environment. The cloud computing environment may include one or more clients 102a-102n, in communication with respective agents 103a-103n and with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
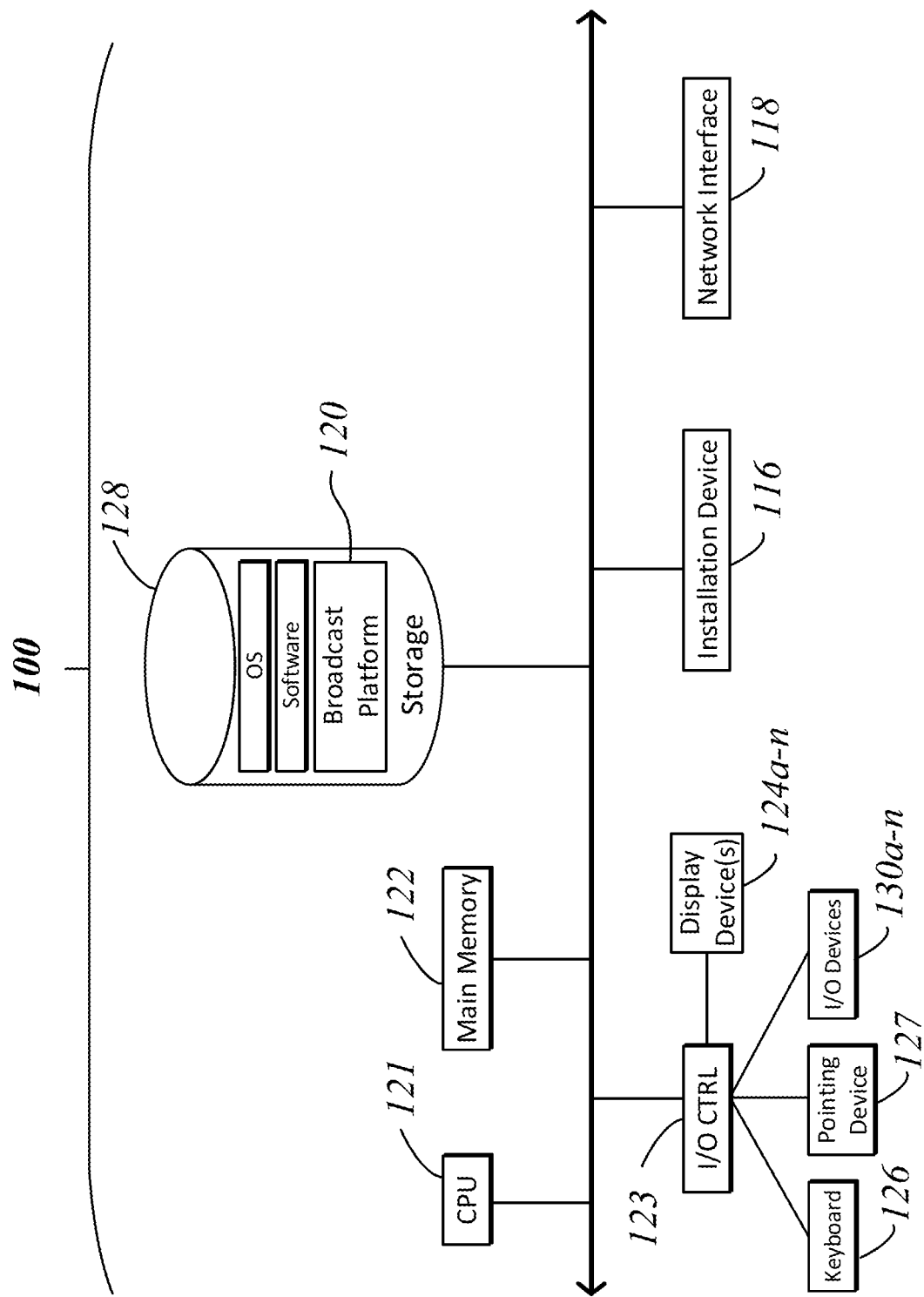
FIGS. 1C and 1D are block diagrams depicting embodiments of computing devices useful in connection with the methods and systems described herein.
Figure 1D:
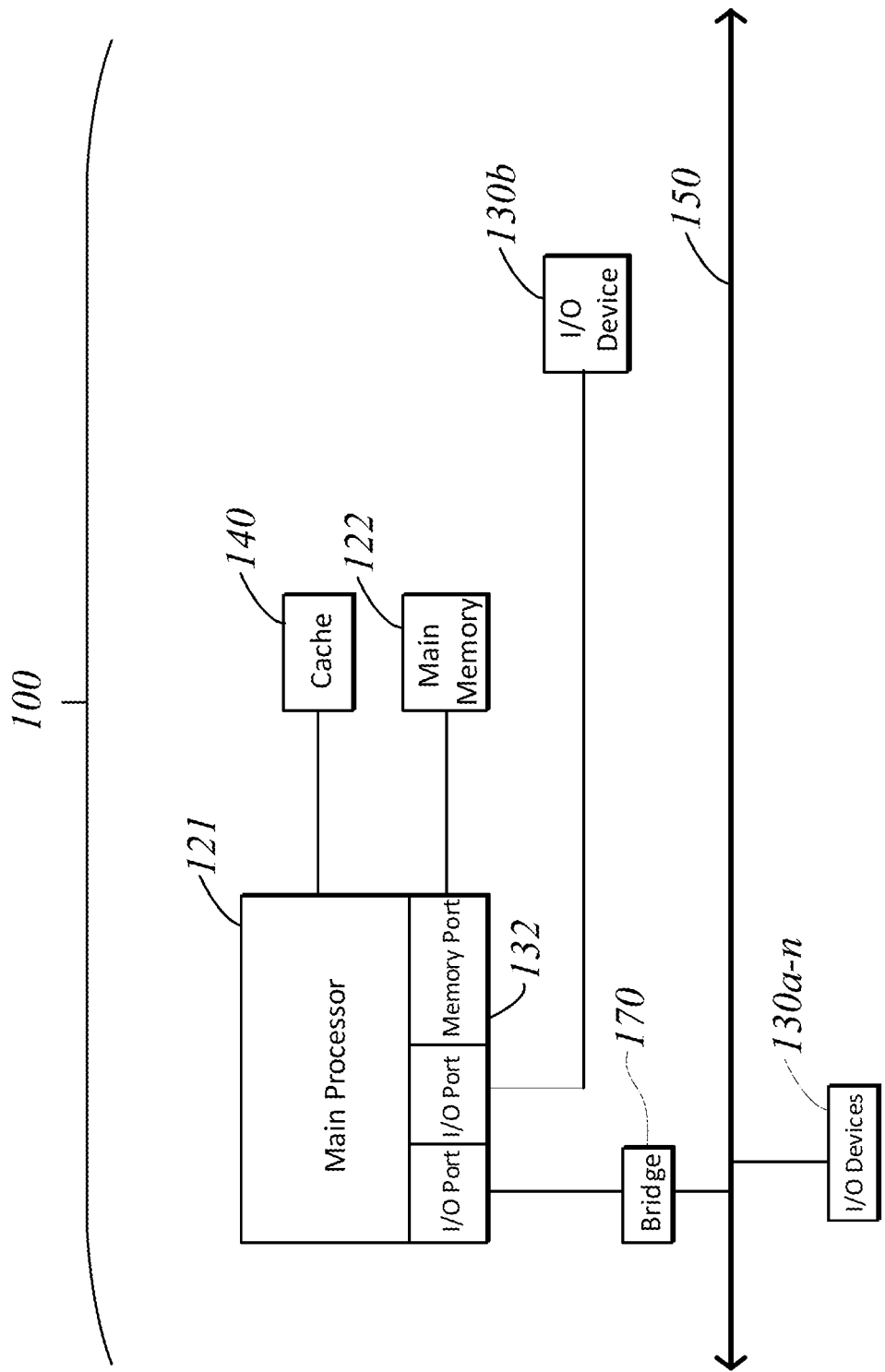

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and broadcast platform 120, which can implement any of the features of the live event system 205 described herein below in conjunction with FIG. 2. As shown in FIG. 1D, each computing device 100 may also include additional optional elements, e.g. a memory port 132, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5, INTEL CORE i7, and INTEL CORE i9.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (B SRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 132. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFIMBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopic. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the broadcast platform 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Computing device 100 may also install software or applications from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Florida. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc. of Cupertino, California; and Linux, a freely-available operating system, e.g. Linux Mint distribution ("distro") or Ubuntu, distributed by Canonical Ltd. of London, United Kingom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a live event system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a live event system. For example, the computer system 100 may comprise a PLAYSTATION 3, a PLAYSTATION 4, PLAYSTATION 5, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, NINTENDO WII U, or a NINTENDO SWITCH device manufactured by Nintendo Co., Ltd., of Kyoto, Japan, an XBOX 360, an XBOX ONE, an XBOX ONE S, or an XBOX ONE S device manufactured by the Microsoft Corporation of Redmond, Washington In some embodiments, the computing device 100 is a digital audio player such as the Apple IPOD, IPOD Touch, and IPOD NANO lines of devices, manufactured by Apple Computer of Cupertino, California Some digital audio players may have other functionality, including, e.g., a live event system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Washington In other embodiments, the computing device 100 is an eBook reader, e.g. the KINDLE family of devices by Amazon.com, or NOOK family of devices by Barnes & Noble, Inc. of New York City, New York In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by one or more metrics, and the plurality of metrics can be applied at least in part towards decisions in load distribution, network traffic management, and network failure recovery as well as any aspects of operations of the present solution described herein.

Aspects of the operating environments and components described above will become apparent in the context of the systems and methods disclosed herein.

B. Live Event Systems with Live Wager Opportunities

Conventionally, broadcast receiver systems or devices, such as cable boxes, set top boxes, and satellite receiver boxes, operate using fixed hardware and software that does not enable third-party communications with external sources. For example, although cable boxes may communicate with broadcast provider systems, such as cable providers or other broadcast providers, such receiver boxes are generally unable to display additional content or monitor the broadcast content displayed by broadcast provider systems. Further, even if such broadcast receiver devices include applications that can communicate with third-party servers, these devices do not include the capabilities to display content or application information at the same time (e.g., in a seamless manner) as broadcast content provided by broadcast systems. The systems and methods of this technical solution these and other issues by extending the functionality of applications and environments on broadcast receiver devices, to provide applications that display additional content, which may include notifications, alerts, or other interactive interfaces, with broadcast content. To do so, a server or other external computing device can generate display instructions for applications executing on such broadcast receiver devices to display additional user interfaces with broadcast content, and transmit those instructions via a computer network or via a proprietary broadcast network maintained by a broadcast provider. In doing so, the additional content, which may include interactive user interfaces, can be displayed such that it that seamlessly integrates the application interfaces with broadcast content provided by a broadcast provider system.

The systems and methods of this technical solution provide techniques for improved live event systems that provide notifications, such as alerts, messages, or interactive user interface elements that display additional content in response to critical events in live content. The live event system described herein can be implemented, for example, in a cloud computing environment, such as the cloud computing environment 108 described herein above in conjunction with FIGS. 1A and 1B. In general, live event systems can provide notifications, alerts, or interactive content that can allow a player to perform one or more actions while viewing broadcast content, such as placing a wager based on a predetermined payout scale provided to the player prior in the interactive content. One example of such interactive content includes a straight bet, in which a player wagers on a single game or event that carries a point-spread or total, and where a player receives a payout if they correctly wager on the team or event that covers the spread. Another example is a parlay bet in which a player wagers on two or more games or events (e.g., using money line bets, straight bets, proposition (or prop) bets, teaser bets) together, and where a player receives a payout if they correctly wagered on each game or event. However, it should be understood that other payout schemes are possible.

The systems and methods described herein improve upon the limitations of conventional broadcast systems by providing additional notifications, alerts, and interactive content for display with broadcast content. The additional interactive content displayed with the broadcast content can be provided based on one or more notification policies. For example, a wager opportunity can be displayed to a player based on a live critical event satisfying a condition of a wager opportunity notification policy. Some non-limiting examples of wager opportunity notification policies can include detecting when the two minute warning in a football game is approaching (e.g., within one minute of the two minute warning), detecting the end of the first half in a basketball game, detecting when sixty minutes have been completed in a soccer game, detecting when a large inning in a baseball game (e.g., one team scored four or more runs in a given inning), or detecting a close game in basketball (e.g., losing team is within 4 points of the winning team with a specified time left in the game). In various implementations, the wager alert can be offered to a player based on a live critical event satisfying a condition of a wager alert notification policy, such as when a player's wager is currently ongoing (e.g., when the game clock of a football game is below two minutes and the player wagered on a prop bet during the final two minutes), or when a payout for a player's wager is about to be decided (e.g., thirty seconds left in a game that the player wagered on the money line). Accordingly, any alert, wager opportunity, or any message provided to a player can be collectively referred to herein as a "notification," or a "wager notification." However, it should be understood that in some implementations, a wager notification may be provided without player interaction.

The systems and methods described herein leverage cloud computing and live event technology to provide wager notification of critical events occurring in live content to end player devices, such as laptops, smart phones, personal computers, smart televisions, or other such computing devices. Although certain aspects of the computing systems described herein are represented as taking place over a network, it should be understood that similar operations can take place on a live event system, such as a sportsbook machine, or another type of independent live event systems that may not require communications between a live event system and a separate live event client and/or broadcast receiver to effectuate the operations described herein. These and other features of live event system are described in greater detail herein below.

Figure 2:
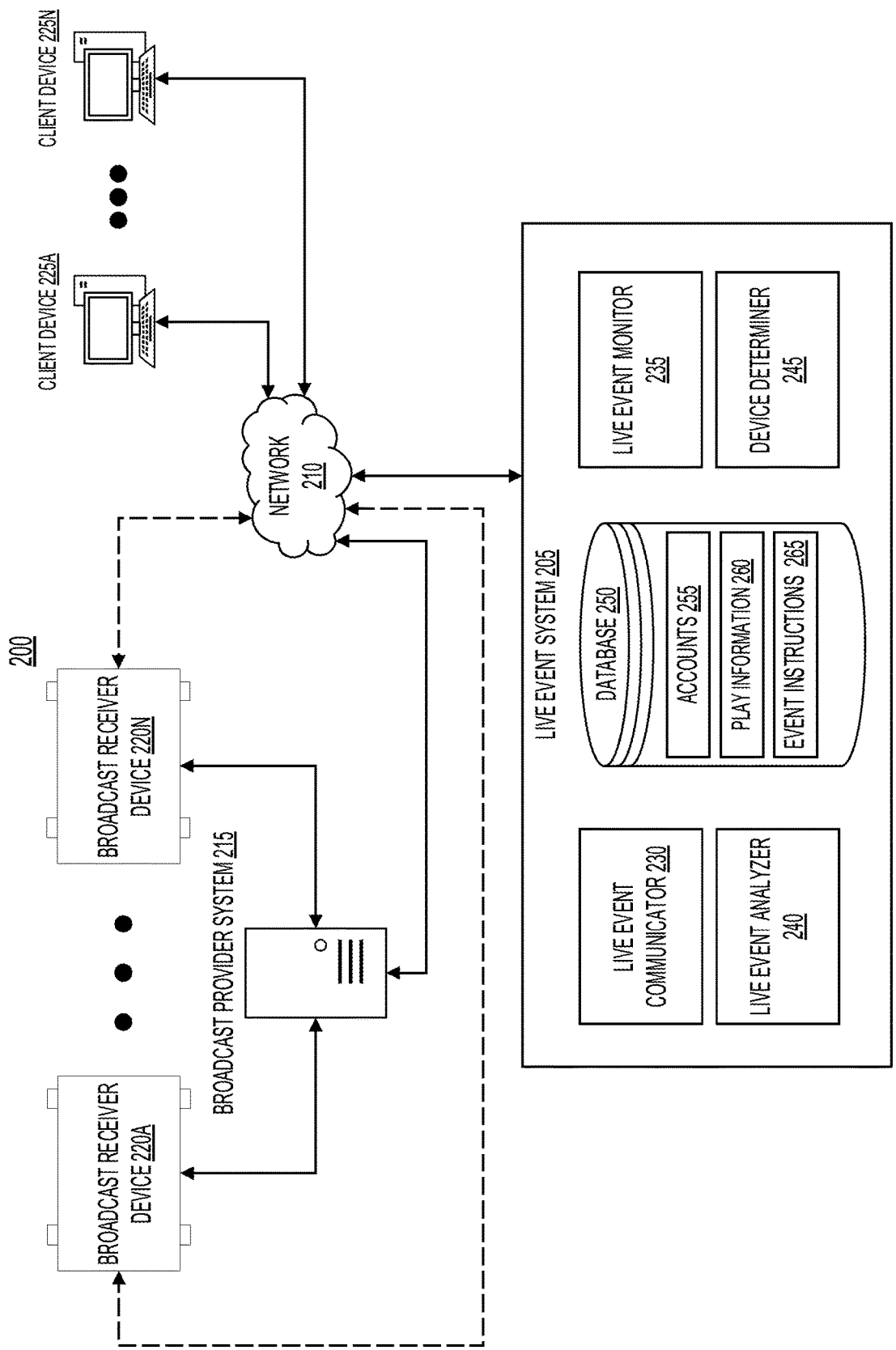
FIG. 2 is a block diagram of an example live event system, in accordance with one or more implementations.

Referring now to FIG. 2, illustrated is a block diagram of an example system 200, in accordance with one or more implementations. The system 200 can include at least one live event system 205, at least one network 210, a broadcast provider system 215, and one or more broadcast receiver devices 220A-220 (sometimes generally referred to as broadcast receiver device(s) 220), one or more client devices 225A-225N (sometimes generally referred to as client device(s) 225). The live event system 205 can include at least one live event communicator 230, at least one live event monitor 235, at least one live event analyzer 240, at least one device determiner 245, and at least one database 250. The database 250 can include one or more accounts 255, one or more play information 260 data structures (sometimes generally referred to as the play information 260), and one or more event information 265 data structures (sometimes generally referred to as the event information 265). In some implementations, the database 250 can be external to the live event system 205, for example, as a part of a cloud computing system or an external computing device in communication with the devices (e.g., the live event system 205, the broadcast provider system 215, the broadcaster receiver devices 220, and/or the client devices 225, etc.) of the system 200 via the network 210.

Each of the components (e.g., the live event system 205, the network 210, the broadcast provider system 215, the broadcast receiver device 220, the client devices 225, the live event communicator 230, the live event monitor 235, the live event analyzer 240, the device determiner 245, etc.) of the system 200 can be implemented using the hardware components or a combination of software with the hardware components of a computing system, such as the computing system 100 detailed herein in conjunction with FIGS. 1A-1D, or any other computing system described herein. Each of the components of the live event system 205 can perform the functionalities detailed herein.

The live event system 205 can include at least one processor and a memory, e.g., a processing circuit. The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The live event system 205 can include one or more computing devices or servers that can perform various functions as described herein. The live event system 205 can include any or all of the components and perform any or all of the functions of the computer system 100 described herein in conjunction with FIGS. 1A-1D.

The network 210 can include computer networks such as the Internet, local, wide, metro or other area networks, intranets, satellite networks, other computer networks such as voice or data mobile phone communication networks, and combinations thereof. The live event system 205 of the system 200 can communicate via the network 210, for instance with one or more client devices 225. The network 210 may be any form of computer network that can relay information between the live event system 205, the broadcast provider system 215, the broadcast receiver devices 220, the one or more client devices 225, and one or more information sources, such as web servers or external databases, amongst others. In some implementations, the network 210 may include the Internet and/or other types of data networks, such as a local area network (LAN), a wide area network (WAN), a cellular network, a satellite network, or other types of data networks. The network 210 may also include any number of computing devices (e.g., computers, servers, routers, network switches, etc.) that are configured to receive and/or transmit data within the network 210. The network 210 may further include any number of hardwired and/or wireless connections. Any or all of the computing devices described herein (e.g., the live event system 205, the broadcast provider system 215, the broadcast receiver devices 220, the one or more client devices 225, the computer system 100, etc.) may communicate wirelessly (e.g., via WiFi, cellular, radio, etc.) with a transceiver that is hardwired (e.g., via a fiber optic cable, a CAT6 cable, etc.) to other computing devices in the network 210. Any or all of the computing devices described herein (e.g., the live event system 205, the broadcast provider system 215, the broadcast receiver devices 220, the one or more client devices 225, the computer system 100, etc.) may also communicate wirelessly with the computing devices of the network 210 via a proxy device (e.g., a router, network switch, or gateway). In some implementations, the network 210 can be similar to or can include the network 104 or the cloud 108 described herein above in conjunction with FIGS. 1A and 1B.

The broadcast provider system 215 can include at least one processor and a memory, e.g., a processing circuit. The memory can store processor-executable instructions that, when executed by processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The broadcast provider system 215 can include one or more computing devices or servers that can perform various functions as described herein. The broadcast provider system 215 can include any or all of the components and perform any or all of the functions of the computer system 100 described herein in conjunction with FIGS. 1A-1D. The broadcast provider system 215 can include similar features and functionality of client devices 102 described herein above in conjunction with FIGS. 1A-1D.

Each broadcast receiver device 220 can include one or more processors and a memory (e.g., a processing circuit). The one or more processors can be any type of computer processor, and can include an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The broadcast receiver devices 220 can include one or more computing devices or servers that can perform various functions as described herein. The one or more broadcast receiver devices 220 can include any or all of the components and perform any or all of the functions of the computer system 100 described herein in conjunction with FIGS. 1A-1D. The broadcast receiver devices 220 can include similar features and functionality of client devices 102 described herein above in conjunction with FIGS. 1A-1D.

Each broadcast receiver device 220 can include, but is not limited to, a cable box (cable converter box, or television converter box), a set-top box, a satellite receiver, a special-use PC Card device (e.g., CableCard, AllVid), a television device, a mobile device, or another type of computing device. A cable box can be a computing device configured to convert digital television signals to analog (or digital) or unscramble a television signal provided by the broadcast provider system 215 and/or live event system 205. A set-top box can be a computing device that can be configured to enable a television or another type of computing device to receive and decode device digital television (DTV) broadcasts. A satellite receiver can be a computing device that can be configured to wirelessly (e.g., over network 210) receive and decode radio signals suitable for viewing by a player. Generally, the cable boxes, set-top boxes, and satellite receivers can be tuning devices that can transpose or convert channels from a cable television service (e.g., provided by broadcast provider system 215 or live event system 205) to an analog (or digital) radio frequency (RF) signal. In some implementations, the broadcast receiver device 220 can be a television or another type of computing device with a converter integrated within the broadcast receiver device 220 (e.g., within a same enclosure). In some implementations, the broadcast receiver devices 220 may be computing devices that receive broadcast content in the form of a live-stream video, for example, via the internet. Live stream videos of live events may be provided via web-based or native application interfaces, and may be received by the broadcast receiver devices 220 via one or more suitable computer networks (e.g., the network 210). In such implementations, the broadcast provider system 215 may be a provider of live stream broadcast content, and can provide the live stream broadcast content via the network 210. Similarly, the broadcast receiver devices 220 may be any type of computing device capable of receiving live stream content via a computer network.

Each broadcast receiver device 220 can be implemented using hardware or a combination of software and hardware. In some implementations, each broadcast receiver device 220 can be configured to receive cable services from the broadcast provider system 215. In various implementations, a broadcast receiver device 220 can include a display or display portion. Alternatively, the broadcast receiver device 220 can be configured to provide a converted signal for display on a computing device such as a client device 225 (e.g., a smart-television, etc.). The display can include a display portion of a television, a display portion of a computing device, a graphical user interface (GUI), or another type of interactive display (e.g., a touchscreen, a display, etc.) and one or more input/output (I/O) devices (e.g., a remote, a controller, a gamepad, a mouse, a keyboard, digital keypad). The display can include one or more portions, for example, to display multiple in-game events as described herein. The broadcast receiver device 220 can execute one or more applications, which may display GUIs such as live event windows and/or notification windows with live content, as described herein. The display can include a border region (e.g., side border, top border, bottom border). In some implementations, the broadcast receiver device 220 can receive one or more interactions from a player (e.g., via an input device such as a remote, controller, gamepad, keyboard, or mouse, etc.). The interactions can result in interaction data, which can be stored and transmitted by the processing circuitry of the broadcast receiver device 220. The interaction data can include, for example, interaction coordinates, an interaction type (e.g., click, swipe, scroll, tap, etc.), and an indication of an actionable object (e.g., an interactive user interface element such as a button, a hyperlink, etc.) with which the interaction occurred. The application executing on the broadcast receiver device 220 can display interactive content with live broadcasts received by the broadcast receiver device 220, and responsive to an interaction (e.g., select, click-on, touch, hover), the application executing on the broadcast receiver device 220 can generate an indication identifying a user input and/or selection of a wager, or an in-game event, among others.

In some implementations, the broadcast receiver device 220 can be configured to convert digital television signals to analog signals and/or unscramble a television signal. Upon converting and/or unscrambling the digital television signal, the broadcast receiver device 220 can provide an output to the display in communication with broadcast receiver device 220 . For example, the broadcast receiver device 220 may be an all-in-one computing device configured to receive and configure signals (e.g., from the live event system 205) and can be configured to display (or stream) content of the television signals on an integrated display of the broadcast receiver device. For example, the broadcast receiver device 220 may be a cable box (or set-top box), or a computing device that receives signals from a satellite broadcast, configured to receive and configure signals (e.g., from the broadcast provider system 215) and can be configured to display (or stream) content of the television signals on an integrated display of the broadcast receiver device 220.

In some implementations, the broadcast receiver device 220 may be a computer-enabled television (referred to herein as a "smart television") that receives decoded broadcast content via a set top box, cable box, or a computing device that receives broadcast satellite signals (a "satellite box"). In such implementations, the broadcast receiver device 220 can receive and display broadcast content provided by the broadcast provider system 215 via the cable box, set top, or satellite box. The broadcast receiver device 220 can execute one or more applications, which may be associated with as the live event system 205 described in greater detail herein below. The application executing on the broadcast receiver device 220 can establish one or more communication sessions with the live event system 205 via the network 210. The application(s) can receive instructions to display notifications as described herein from the live event system 205, which may be presented on one or more user interfaces with the broadcast content received via the cable box, set top box, or satellite box. In such implementations, the broadcast receiver device 220 can communicate with the cable box, set top box, or satellite box to perform one or more actions, such as schedule or modify a recording, or to change to a different broadcast channel.

For example, in some implementations, the instructions provided by the live event system 205 can include instructions to present actionable objects which, when actuated, cause the broadcast receiver device 220 to navigate to and display broadcast content different from broadcast content currently being displayed. To do so, the smart television (e.g., the broadcast receiver device 220), upon detecting the actuation, may communicate a request to the cable box, set top box, or satellite box to navigate to broadcast content identified in the instructions. For example, the instructions may identify a particular channel or channel(s) on which the broadcast content is being displayed. The broadcast receiver device 220 (or the application executing thereon) can send a request to the cable box, set top box, or satellite box to navigate to the identified channel. In some implementations, the application executing on the smart television (e.g., the broadcast receiver device 220) can communicate with the broadcast provider system 215 to request a channel guide or schedule corresponding to the player associated with the cable box, set top box, or satellite box. Using the channel guide, the application executing on the broadcast receiver device 220 can identify the specific channel on which the broadcast content identified in the instructions is being provided. Once the channel is identified, the broadcast receiver device 220 can transmit a request to the cable box, set top box, or satellite box to navigate to and display the channel. The broadcast receiver device 220 can communicate with the cable box, set top box, or satellite box via any number of communication protocols, such as a Bluetooth protocol, a WiFi protocol (e.g., web-sockets), or any other type of communication protocol.

Each broadcast receiver device 220 can include a device identifier, which can be specific to each respective broadcast receiver device 220. The device identifier can include a script, code, label, or marker that identifies a particular broadcast receiver device 220. In some implementations, the device identifier can include a string or plurality of numbers, letters, characters or any combination of numbers, letters, and characters. In some embodiments, each broadcast receiver device 220 can have a unique device identifier. Each broadcast receiver device 220 can include a client application, which can be a live event application that communicates with the live event system 205 to view live events and make wagers described herein. The client application can include a user application executing on each broadcast receiver device 220 or provided to the broadcast receiver device 220 by the server 102. The application can include a web application, a server application, a resource, a desktop, or a file. In some implementations, the application can include a local application (e.g., local to a broadcast receiver device 220), hosted application, Software as a Service (SaaS) application, virtual application, mobile application, and other forms of content. In some implementations, the application can include or correspond to applications provided by remote servers or third-party servers. In some implementations, the application can access the accounts 255, the play information 260, or the event information 265, stored and maintained at the database 250, and generate one or more actionable objects, such as the actionable objects described herein below in conjunction with FIGS. 3A-3E, to a user through a broadcast receiver device 220. Such actionable objects can include user-selectable hyperlinks, buttons, graphics, videos, images, or other application features that generate a signal that is processed by the application executing on the respective broadcast receiver device 220.

In some implementations, one or more broadcast receiver devices 220 can establish one or more communication sessions of the live event system 205, the broadcast provider system 215, and/or the one or more client devices 225. The one or more communication sessions can each include a channel or connection between the live event system 205 and the one or more broadcast receiver devices 220. The one or more communication systems can each include an application session (e.g., virtual application), an execution session, a desktop session, a hosted desktop session, a terminal services session, a browser session, a remote desktop session, a URL session and/or a remote application session. Each communication session can include encrypted and/or secure sessions, which can include an encrypted file, encrypted data or traffic. The communication sessions may be established via the broadcast provider system 215.

In some implementations, the broadcast provider system 215 can be an intermediary device between the one or more broadcast receiver devices 220 and live event system 205. In such implementations, a communication session can be established between the broadcast receiver devices 220 and live event system 205 via the broadcast provider system 215. For example, the broadcast provider system 215 can receive data (e.g., wagers, real-time live event information, messages, indications of content being displayed at the respective broadcast receiver device 220, etc.) from the broadcast receiver device 220 via a cable distribution network or network 210. In response to receiving data the broadcast provider system 215 can route (or forward) the data to the live event system 205 via network 210. In some implementations, the broadcast provider system 215 may analyze the data and modify various data structures such as, but not limited to, removing identifying information, removing secure information, removing financial information, adding a broadcast provider system identifier, adding profile and/or use information, etc. prior to routing the data to the live event system 205. Furthermore, the broadcast provider system can also receive data from the live event system 205 that can be routed to the broadcast receiver device 220 (using similar techniques described above). In various implementations, the live event system 205 and broadcast receiver device 220 can establish a direct communication session via network 210. In some implementations, the communication session may be secure such that data can be masked by the broadcast receiver device 220 and/or broadcast provider system 215 prior to sending it to the live event system 205.

In implementations where the broadcast receiver devices 220 can communicate via the network 210, each of the broadcast receiver devices 220 can access information resources, such as web pages via a web browser, or application resources via a native application executing on a broadcast receiver device 220. When accessing information resources, the broadcast receiver device 220 can execute instructions (e.g., embedded in the native applications, in the information resources, etc.) that cause the broadcast receiver devices 220 to display event interfaces, such as the event interfaces described herein below in conjunction with FIGS. 3A-3E. The live event application interfaces can be, for example, application interfaces that present different types live event, notifications, or other types of interactive content. In general, live events include content (e.g., images, video, animations, graphics, audio, etc.) that can be presented to a player via the input/output interfaces of a client device 225, and/or broadcast receiver device 220.

In response to interaction with user interface elements, the broadcast receiver devices 220 can transmit information, such as account information (e.g., changing account parameters, changing login information, etc.), interaction information, selections of wager amounts, selections of wager participation in live events, or other signals to the live event system 205. In some implementations, a broadcast receiver device 220 can transmit a request to present a live event. The request can include, for example, a request to present a particular live event (e.g., can include a live event identifier, etc.), which can include an indication to wager. In some implementations, a broadcast receiver device 220 can transmit, during a live event, a signal to the live system 205 that indicates a desire to wager in an additional opportunity for that live event. The request can be a hypertext transfer protocol (HTTP or HTTPS) request message, a file transfer protocol message, an email message, a text message, or any other type of message that can be transmitted via the network 210.

In general, upon receiving a notification with an opportunity to wager or an indication of an ongoing wager, a broadcast receiver device 220 (or an application executing on the broadcast receiver device 220) can receive data relating to the requested live event from the live event system 205. The data relating to the requested live event can include current in-event information (sometimes referred to herein as event statistics) (e.g., player statistics, team statistics, game statistics), which can be maintained by one or more of the components of the live event system 205, as described herein. Event information can include one or more data structures that include any information related to an event, such as current time, current score, wager information (e.g., information about wager opportunities, information about ongoing wagers), information about whether the player has indicated a desire to wager in similar scenarios (e.g., previous activity), or other event information described herein. In some implementations, the event information can be updated in real-time on the broadcast receiver device 220 (or client devices 225) as the live event occurs (or progresses) (e.g., as the event is processed by the live event system 205 according to the event information 265, etc.). The indications of event information can include instructions that cause the broadcast receiver device 220 to display one or more wager opportunities based on current in-game events (e.g., elapsed time, player statistics, team statistics, game statistics, etc.) and historical activity data of accounts 255, among others. The broadcast receiver devices 220 can receive instructions from the live event system 205 that can cause the broadcast receive device 220 to display one or more actionable objects, such as the actionable objects described herein below in conjunction with FIGS. 3A-E.

As described herein, a broadcast receive device 220 can receive one or more interactions with actionable objects presented on the display of the client device. Interactions can be tap interactions, click interactions, or other types of indications that a user has engaged with a particular user interface element. Upon detecting an interaction with a particular user interface element, the broadcast receiver device 220 can execute instructions (e.g., processor-readable code, a script, etc.) that cause the broadcast receiver device 220 to transmit an appropriate signal to the live event system 205, for example, via the broadcast provider system 215. A signal can include any information specified by the instructions associated with the particular actionable object with which the user interacted. The signals can include, for example, a wager submission, a request to view a live event associated with a current or potential wager, among others.

As described herein, a broadcast receiver device 220 and the live event system 205 can exchange messages directly (or indirectly via broadcast provider system 215) containing information that causes an interactive live event interface to be displayed on the display of the broadcast receiver device 220. By interacting with the actionable objects presented on the display of the broadcast receiver device 220, the live event system 205 can provide wager opportunities and wager alerts and transmit instructions to the broadcast receiver device 220 that cause the broadcast receiver device 220 to change the user interface in accordance with the live event, notification transmission policy, and/or notification generation policy. In some implementations, the broadcast receiver device 220 can receive content for presentation on the display of the client device 225 in a streaming arrangement (e.g., content is streamed from the live event system 205 using a streaming protocol, etc.).

The client devices 225 can include similar features and functionalities as the broadcast receiver device 220. Each of the client devices 225 can include at least one processor and a memory, e.g., a processing circuit. The memory can store processor-executable instructions that, when executed by processor, cause the processor to perform one or more of the operations described herein. The processor can include a microprocessor, an ASIC, a FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The client devices 225 can include one or more computing devices or servers that can perform various functions as described herein. The one or more client devices 225 can include any or all of the components and perform any or all of the functions of the computer system 100 described herein in conjunction with FIGS. 1A-1D. The client devices 225 can be, or can be similar to, the client devices 102 described herein above in conjunction with FIGS. 1A-1D.

Each client device 225 can include, but is not limited to, a smartphone, a mobile device, a personal computing device, or another type of computing device. Each client device 225 can be implemented using hardware or a combination of software and hardware. Each client device 225 can include a display or display portion. The display can include a display portion of a television, a display portion of a computing device, a GUI, or another type of interactive display (e.g., a touchscreen, a display, etc.) and one or more I/O devices (e.g., a mouse, a keyboard, digital key pad). The display can include one or more portions, for example, to display multiple in-game events as described herein. The display can include a touch screen displaying an application, such as live event windows and/or notification windows described herein.

The display can include a border region (e.g., side border, top border, bottom border). In some implementations, the display can include a touchscreen display, which can receive interactions from a player. The interactions can result in interaction data, which can be stored and transmitted by the processing circuitry of the client device 225. The interaction data can include, for example, interaction coordinates, an interaction type (e.g., click, swipe, scroll, tap, etc.), and an indication of an actionable object with which the interaction occurred. Each client device 225 can include an input device that couples or communicates with the display of each client device to enable a player to interact with and/or select one or more actionable objects as described herein. The display can enable interaction with one or more visual indications provided through the display of each client device 225, and be responsive to an interaction (e.g., select, click-on, touch, hover), the client device 225 can generate an indication identifying a user input and/or selection of a wager, or an in-game event, among others.

Each client device 225 can include a device identifier, which can be specific to each respective client device 225. The device identifier can include a script, code, label, or marker that identifies a particular client device 225. In some implementations, the device identifier can include a string or plurality of numbers, letters, characters or any combination of numbers, letters, and characters. In some embodiments, each client device 225 can have a unique device identifier. Each client device 225 can include a client application, which can be a live event application that communicates with the live event system 205 to view live events and make wagers described herein. The client application can include a user application executing on each client device 225 or provided to the client device 225 by the server 102. The application can include a web application, a server application, a resource, a desktop, or a file. In some implementations, the application can include a local application (e.g., local to a client device 225), hosted application, SaaS application, virtual application, mobile application, and other forms of content. In some implementations, the application can include or correspond to applications provided by remote servers or third-party servers. In some implementations, the application can access the accounts 255, the play information 260, or the event information 265, stored and maintained at the database 250, and generate one or more actionable objects, such as the actionable objects described herein below in conjunction with FIGS. 3A-3E, to a user through a client device 225. Such actionable objects can include user-selectable hyperlinks, buttons, graphics, videos, images, or other application features that generate a signal that is processed by the application executing on the respective client device 225.

In some implementations, one or more client devices 225 can establish one or more communication sessions between the live event system 205, the broadcast provider system 215, the broadcast receiver devices 220, and/or the one or more client devices 225. The one or more communication sessions can each include a channel or connection between the live event system 205 and the one or more client devices 225. The one or more communication sessions can each include an application session (e.g., virtual application), an execution session, a desktop session, a hosted desktop session, a terminal services session, a browser session, a remote desktop session, a URL session and/or a remote application session. Each communication session can include encrypted and/or secure sessions, which can include an encrypted file, encrypted data or traffic.

Each of the client devices 225 can be computing devices configured to communicate via the network 210 to access information resources, such as web pages via a web browser, or application resources via a native application executing on a client device 225. When accessing information resources, the client device can execute instructions (e.g., embedded in the native applications, in the information resources, etc.) that cause the client devices 225 to display event interfaces, such as the event interfaces described herein below in conjunction with FIGS. 3A-3E. The client device 225 (or in some implementations, the broadcast receiver devices 220) can present different types of content, such as notifications, Internet or networked live streams of live events (e.g., which may correspond to, or be, broadcasts of live events received by the broadcast receiver device 220) or other types of interactive content described herein. In general, content can include any type of media (e.g., images, video, animations, graphics, audio, etc.) that can be presented to a player via the input/output interfaces of a client device 225, and/or broadcast receiver device 220. Content, such as wager opportunities, can be displayed.

In response to interaction with user interface elements, the devices 225 can transmit information, such as account information (e.g., changing account parameters, changing login information, etc.), interaction information, selections of wager amounts, selections of wager participation in live events, or other signals to the live event system 205. In some implementations, a client device can transmit a request to present one or more wager opportunities. The request can include, for example, a request to present wager opportunities related to a particular live event (e.g., can include a live event identifier, etc.). In some implementations, a client device 225 can transmit, during a live event, a signal to the live system 205 that indicates a desire to wager in one or more additional opportunities for that live event. The request can be an HTTP or HTTPS request message, a file transfer protocol message, an email message, a text message, or any other type of message that can be transmitted via the network 210.

In general, upon receiving a notification with an opportunity to wager or an indication of an ongoing wager, a client device 225 (or an application executing on the client device 225) can receive data relating to the requested live event from the live event system 205. The data relating to the requested live event can include current in-event information (sometime referred to herein as event statistics) (e.g., player statistics, team statistics, game statistics), which can be maintained by one or more of the components of the live event system 205, as described herein. Event information can include one or more data structures that include any information related to an event, such as current time, current score, wager information (e.g., information about wager opportunities, information about ongoing wagers), information about whether the player has indicated a desire to wager in similar scenarios (e.g., previous activity), or other event information described herein. In some implementations, the event information can be updated in real-time on the client devices 225 (or broadcast receiver devices 220) as the live event occurs (or progresses) (e.g., as the event is processed by the live event system 205 according to the event information 265, etc.). The indications of event information can include instructions that cause the client device 225 to display one or more wager opportunities based on current in game events (e.g., elapsed time, player statistics, team statistics, game statistics, etc.) and historical activity data of accounts 255, among others. The client devices 225 can receive instructions from the live event system 205 that can cause the client device 225 to display one or more actionable objects, such as the actionable objects described herein below in conjunction with FIGS. 3A-E.

As described herein, a client device 225 can receive one or more interactions with actionable objects presented on the display of the client device. Interactions can be tap interactions, click interactions, or other types of indications that a user is engaged with a particular user interface element. Upon detecting an interaction with a particular user interface element, the client device 225 can execute instructions (e.g., processor-readable code, a script, etc.) that cause the client device 225 to transmit an appropriate signal to the live event system 205. A signal can include any information specified by the instructions associated with the particular actionable object with which the user interacted. The signals can include, for example, a wager submission, a request to view a live event associated with a current or potential wager, among others.

As described herein, a client device 225 and the live event system 205 can exchange messages containing information that causes an interactive live event interface to be displayed on the display of the client device 225. By interacting with the actionable objects presented on the display of the client device 225, the live event system 205 can provide wager opportunities and wager alerts, and transmit instructions to the client device 225 that cause the client device to change the user interface in accordance with the live event, notification transmission policy, and/or notification generation policy. In some implementations, the client device 225 can receive content for presentation on the display of the client device 225 in a streaming arrangement (e.g., content is streamed from the live event system 205 using a streaming protocol, etc.).

The database 250 can be a computer-readable memory that can store or maintain any of the information described herein. The database 250 can maintain one or more data structures, which may contain, index, or otherwise store each of the values, pluralities, sets, variables, vectors, numbers, or thresholds described herein. The database 250 can be accessed using one or more memory addresses, index values, or identifiers of any item, structure, or region maintained in the database 250. The database 250 can be accessed by the components of the live event system 205, or any other computing device described herein, via the network 210. In some implementations, the database 250 can be internal to the live event system 205. In some implementations, the database 250 can exist external to the live event system 205 and may be accessed via the network 210. The database 250 can be distributed across many different computer systems or storage elements and may be accessed via the network 210 or a suitable computer bus interface.

The live event system 205 can store, in one or more regions of the memory of the live event system 205, or in the database 250, the results of any or all computations, determinations, selections, identifications, generations, constructions, or calculations in one or more data structures indexed or identified with appropriate values. Any or all values stored in the database 250 may be accessed by any computing device described herein, such as the live event system 205, to perform any of the functionalities or functions described herein. In some implementations, the database 250 can be similar to or include the storage 128 described herein above in conjunction with FIG. 1C. In some implementations, instead of being internal to the live event system 205, the database 250 can form a part of the cloud computing system of FIG. 1B. In such implementations, the database 250 can be a distributed storage medium in a cloud computing system and can be accessed by any of the components of the live event system 205, by the broadcast provider system 215, the broadcaster receiver devices 220 (e.g., via the player interface similar to that depicted in FIGS. 3A-3E, etc.), or the client devices 225, or any other computing devices described herein.

The database 250 can store one or more accounts 255 (sometime referred to herein as "player profiles") associated with a player of a broadcast receiver device 220 and/or a client device 225. The account 255 can be a player profile that includes information about a player and information about one or more broadcast receiver devices 220 and/or one or more of the client devices 225 used to access the live event system 205 using the account 255. For example, identifiers of an account can be used to access the functionality of the live event system 205. The identifiers can include a username, a password, an e-mail address, a phone number, a personal identification number (PIN), a secret code-word, device identifiers for use in a two-factor authentication technique, among others. The account 255 can store information about wagers, events, and notifications that are provided by the live system 205. The account 255 can store a credit balance, wager information (e.g., an amount of a wager, a timestamp associated with a wager, information about broadcast receiver device 220 including historical device data associated with previously viewed events, a client device identifier of a client device 225 or a broadcast receiver device 220 that was used to place the wager, a broadcast receiver device identifier of a device that was used to place the wager or presented a notification, a broadcast provider system 215 identifier that provides one or more services to the account, etc.). The account 255 can store information about a client device 225 or a broadcast receiver device 220 used to access the live event system 205 such as an IP address, a MAC address, a GUID, an account name (e.g., the name of a user of the client device 225, etc.), device name, among others. In some implementations, an account 255 can be created by the live event system 205 in response to an account creation request transmitted by a client device 225. The account creation request can include any of the account information described herein.

The database 250 can store or maintain play information 260 associated with each of the one or more accounts 255. The play information 260 can include event information for event previously viewed and/or wagered, or currently viewing and/or wagering, by a client device 225 and/or broadcast receiver device 220 having a corresponding account 255. In some implementations, a client device 225 accessing the live event system 205 may not be associated with an account 255. In such implementations, the live event system 205 can automatically create an account 255 using an identifier of the client device 225 provided by the client device 225 and/or an identifier of the broadcast receiver device 220 provided by the broadcast provider system 215 and/or broadcast receiver device 220. The play information 260 can include information about previous wagers, actions, interactions, or other data provided by the devices described herein (e.g., 215, 220, 225) during the interaction with an event (e.g., viewing, wagering, selecting, etc.) provided by the live event system 205. The play information 260 can maintain an event state of one or more events (e.g., before the event, during the event, and after the event). As described herein, the event state can include one or more data structures that include any information related to an event state, such as current time remaining, timeouts left, wager information, stoppages, injuries, information about whether the user has indicated a desire to participate in wager opportunities (e.g., select a notification while viewing a different event), event statistics, or other event state data described herein. In some implementations, the indications of the event state can be received as an event of the game occurs (e.g., as the event is processed by the live event system 205 according to the event instructions 265, etc.). The event state can include options that a user may take at each portion of an event, and any actions (e.g., interactions, pausing/waiting for a particular duration at stored timestamps, etc.) the broadcast receiver device 220 and/or client device 225 takes in response to said options.

The database 250 can store or maintain event instructions 265. As used herein, an "event" may be any occurrence of a live event broadcast such as, but not limited to, a competition or game. In some embodiments, each competition and/or game may have one or more events during play (e.g., entirety of game, first quarter, second period, any time period, among others). As referred to herein, each event of the plurality of events may considered "critical events." For example, a football game may have a first critical event that is the entire game, a second critical event that is the second quarter, and a third critical event that is the time period between the last two minutes of the fourth quarter. The event instructions 265 can include instructions to process content of critical events described herein (e.g., wagers instructions, policy instructions). The event instructions 265 can include one or more notification that are provided in response to a particular event state. In short, the event instructions 265 can include instructions to process live event content from start to finish and providing content to each of the broadcast receiver devices 220 directly (e.g., via network 210) and/or indirectly (e.g., via broadcast provider system 215). The event instructions 265 can be stored in one or more data structures that are indexed by an event name (e.g., Packers v. Bears, Jets v. Giants, Knicks v. 76ers, Yankees v. Astros, any other event, etc.) or critical event (e.g., a play in the Packers v. Bears game, the end of a quarter in the Kicks v. 76ers game, etc.). The event instructions 265 can be processor executable instructions that cause the live event system 205 to detect critical events in live content. In some implementations, the event instructions 265 can include artificial intelligence models (e.g., machine learning models, neural network, decision trees, ruled-based lookup table, etc.) that cause the live event system 205 to detect critical events and provide wager opportunities to a player of one of the events in the event instructions 265.

The event instructions 265 can include odds information, which can be stored as probability values of certain in-game events occurring. The odds information can be altered based on actions taken by the player. The odds information can reflect a particular expected outcome (e.g., an expected value of player loss, an expected value of player win, etc.). The live event system 205 can use the event instructions 265 to update the event state in the play information 260 by monitoring a live event as the live event is played and/or viewed by the broadcast receiver devices 220. In various implementations, viewership can be determined based on receiving statistic data from the broadcast provider system 215 indicating the number of broadcast receiver devices 220 viewing one or more particular events. In some implementations, the event instructions 265 can update the odds information in response to an indication (e.g., as stored in the play information 260, etc.) of a wager based on a provided wager opportunity and/or wager alert. The event instructions 265 can include descriptions of events or event criteria that can activate (e.g., provide, etc.) a wager opportunity or alert. For example, during a football game, the live event system 205 can detect a big play (e.g., a critical event such as a 50+ yard pass) as it occurs during a live event, and determine that the big play satisfies a notification generation policy. The live event system 205 may then provide a notification, an alert, or interactive content such as a wager opportunity. In some implementations, the live event system 205 can generate an interactive content item including a wager opportunity that is related to the detected critical event (e.g., whether the team that made the 50+ yard pass will score a touchdown, etc.). The live event system 205 can transmit the content to the broadcast receiver devices 220 based on a notification transmission policy.

In another example, during a basketball game, the live event system 205 can detect a critical event such as a large run (e.g., a 12-0 run), and determine that the critical event satisfies a notification generation policy. Upon detecting the critical event, the live event system 205 may generate instructions to display a notification, an alert, or interactive content that includes, for example, interactive user interface elements that allow a user to wager (e.g., over/under, prop bet) on if the opposing team (e.g., scored 0 points when the other team scored 12 consecutive) will win the game. The instructions can be transmitted to one or more broadcast receiver devices 220 from display based on a notification transmission policy. In yet another example, during a baseball game, the live event system 205 may detect a critical event (e.g., an event satisfying a notification generation policy) as when a game tying run is on second base with no outs in the ninth inning (e.g., an event). Upon detecting the critical event, the live event system 205 may generate instructions that display interactive content including a wager opportunity. The wager can be related to the detected critical event. For example, the wager can be if the game tying run will score. Upon generating the instructions, the event processing system 205 can transmit the instructions to one or more broadcast receiver devices 220 based on a notification transmission policy. The event instructions 265 can specify the conditions under which the user can be provided a wager opportunity and/or alert when the condition is met (e.g., at quarter end, after predetermined point differential, after predetermined statistics occurred, etc.). Each of the components of the live event system 205 can access, update, or modify the accounts 255, the play information 260, or the event instructions 265, to carry out functionalities described herein. Although various examples of critical events are provided herein that are related to sporting events, it should be understood that any type of event in any type of live content may be identified as a critical event in the event instructions 265.

Referring now to the operations of the live event system 205, the live event monitor 235 can access one or more messages related to a live event broadcast. The one or more messages can be provided by the broadcast receiver devices 220 or the client devices 225, and may include an identifier of a live event, a message type, or information related to a condition or moment that occurred or could occur in the live event. In some implementations, the messages can be transmitted by the broadcast provider system 215 (e.g., where the broadcast receiver devices 220 communicate with the live event system 205 via the broadcast provider system 215), the broadcast receiver devices 220 directly (e.g., via the network 210), and/or the client devices 225. In some implementations, one or more of the messages can include an identifier of a live event broadcast. Each message can indicate a corresponding broadcast receiver device 220 from which the message was transmitted that is receiving the live event broadcast from the broadcast provider system 215 (or directly from live event system 205) and can include event information of a live event broadcast.

In various implementations, the live event monitor 235 can access the messages via one or more content sources (e.g., broadcast provider system 215). In some implementations, the messages can include one or more wagers. Upon receiving and/or accessing the messages, the live event analyzer 240 can determine if at least one message of the plurality of messages satisfy a condition of a notification generation policy relating to the live event. In particular, one or more notification generation policies can be stored in event instructions 265, and can include defined policies (or rules) related to events within a live event broadcast such that, when an event occurs, the live event system 205 can generate a notification (e.g., an alert, a message, interactive user interface elements including a wager opportunity, etc.) for display with the broadcast of the live event at one or more broadcast receiver devices 220.

In some implementations, the live event monitor 235 can receive messages that correspond to a live event from other electronic sources, such as social media networking systems, chat systems, email systems, or other types of communication systems. The live event monitor 235 can monitor, scrape, receive, retrieve, or otherwise access messages from such systems, and extract the information from each message to identify information corresponding to live events. For example, the live event monitor 235 can identify messages that include one or more tags for live events. The live event monitor 235 may perform additional processing on the messages, for example, by executing a natural language processing model over the messages received from communication networks (e.g., on social media posts) to identify indications of upcoming moments of interest in live events. The critical events can be, for example, a close score that will be decided on an upcoming play of a sports game, or any other type of critical event described herein. In some implementations, the live event monitor 235 can identify critical events by communicating (via the network 210) with one or more external computing systems, such as a computing system that maintains score information, game state information (e.g., a current state of a live sports game, etc.), or other information relating to live events. These communications can be periodic requests to such external computing systems, or can be indications of upcoming critical events received from such external computing systems.

In various implementations, the device determiner 245 can identify a subset of broadcast receiver devices 220 to provide instructions to display notifications identifying detected critical events. That is, the device determiner 245 can identify the subset of broadcast receiver devices 220 based on a notification transmission policy relating to the live event. For example, the notification transmission policy can be when an account 255 associated with a broadcast receiver device 220 includes one or more attributes that are similar to the live event. To determine whether the notification policy is satisfied, the live event system 205 can determine a match score between attributes of an account 255 associated with a broadcast receiver device 220 and attributes of the live event. Additionally, the identified subset of broadcast receiver devices 220 can be identified based on one or more attributes of each player profile of the plurality of player profiles stored in accounts 255. In some implementations, the live event communicator 230 can provide the broadcast receiver devices 220 (e.g., via the broadcast provider system 215) instructions to display one or more notifications identifying the live event and including one or more actionable objects that can cause the broadcast receiver device 220 to display a broadcast of the live event.

Referring to the notification transmission policy in more detail, each player profile may include attributes associated with one or more preferences of the player. The attributes associated with preference can be set by the user or determined by the live event system 205. For example, if the player has never watched a tennis match on a broadcast receiver device 220, a tennis attribute may include a preference to not provide notification for tennis live events. Furthermore, the tennis attribute may be based on one or more preferences. For example, the player may never watch tennis, but the player may also never wager on tennis and switches away from the TV channel whenever tennis is on. In this example, the attribute of the notification transmission policy relating to tennis may include a preference to not provide notification for tennis based on the one or more preferences.

In yet another example, if a player is a baseball fanatic that watches baseball every night on the broadcast receiver device 220, checks scores on their client device 225, and/or regularly wagers on baseball live events (e.g., at least every week), a baseball attribute may include a preference to provide notification for baseball live events. In yet another example, if a player is a Dallas Cowboy's fan that watches every Cowboy's game on the broadcast receiver device 220, checks scores on their client device 225, and/or regularly wagers on the Cowboy live events (e.g., at least every other game), a football attribute may include a preference to provide notification for Cowboy live events. In yet another example, if a player always wagers on the 1 pm EST football games on Sunday, a football attribute may include a preference to provide notification for football live events starting at 1 pm EST. Accordingly, notification transmission policies can include attributes for various event types (e.g., tennis, baseball, football, soccer, etc.), various teams (e.g., Team A, Team B, Team C), and/or various times (e.g., Saturday college football games, Thursday night football game, Sunday 1 pm EST football games), etc. It should be understood that the attributes of notification transmission policies are purely example attributes, and other attributes are possible.

Figure 3A:
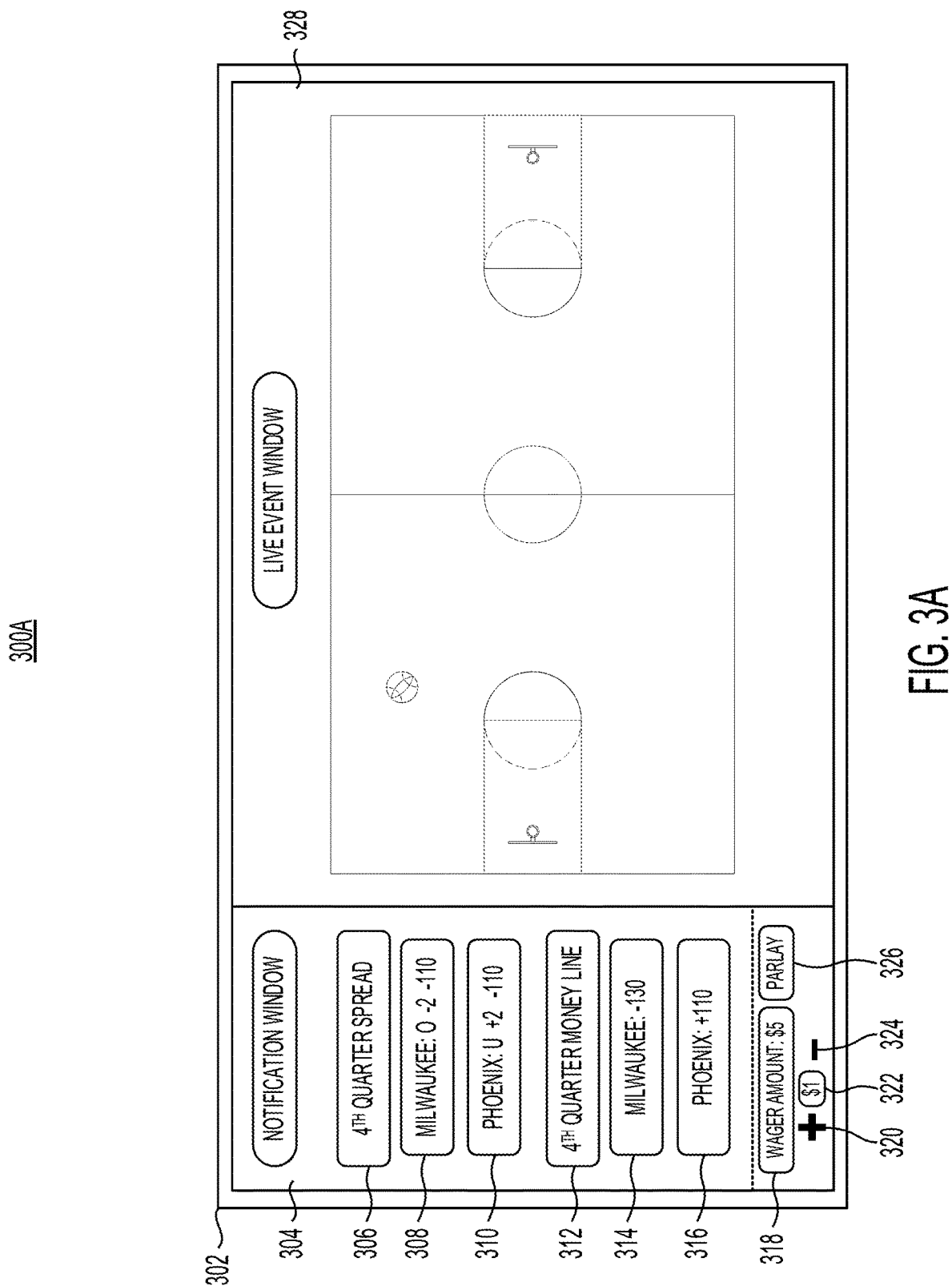

Referring briefly now to FIG. 3A, depicted is an example live event broadcast 300A displayed on a broadcast device, such as the broadcast receiver device 220. Similar notification windows 304 can be displayed at a client device 225, for example, to allow a user to provide one or more wagers corresponding to a critical event that occurred in a live broadcast. The live event broadcast 300A can include a display device 302 that includes a live event window 328 and a notification window 304. The display device 302 may be a broadcast receiver device 220 and/or client device 225. In some implementations, the notification window 304 may be presented and the live event window 328 may be adjusted (e.g., automatically re-dimensioned to fit the notification window 304) based on receiving instructions to display a notification identifying one or more live events and wager opportunities. In various implementations, the instructions (e.g., generated by the live event system 205) may be received from the broadcast provider system 215 (e.g., via a cable distribution network or network 210) and/or from live event system 205 (e.g., via network 210). The instructions can cause the broadcast receiver device 220, or an application executing on the broadcast receiver device 220, to display the notification window 304 with the live event 328.

In some implementations, the live event broadcast 300A can be displayed on a display device, such as a computer-enabled television (e.g., a smart television) that receives decoded broadcast content via a set top box or cable box. In such implementations, the smart television can be a receiver device, such as a broadcast receiver device 220 described in connection with FIG. 2, which receives the live event 328 via the cable box or set top box which is in communication with a broadcast provider, such as the broadcast provider system 215 described in connection with FIG. 2. The smart television can execute one or more applications, which may be associated with a live event system, such as the live event such 205 described in connection with FIG. 2. The application(s) executing on the smart television can establish one or more communication sessions with the live event system via a network, such as the network 210 described in connection with FIG. 2. The application(s) can receive instructions to display notifications as described herein from the live event system, and display the notifications in the notification window 304. As shown, the application may display the notification window 304 in a predetermined region of the display of the smart television, while the live event 328 is displayed in a second, larger region such that it is still viewable by a viewer. It should be understood that other arrangements of the notification window 304 and the live event window 328 are possible, with different portions of the display being occupied each window.

As shown in the FIG. 3A, the live event broadcast 300A can include wagering actionable objects (e.g., 308, 310, 314, 316, 320, 322, 324, 326) that can be interactive (e.g., selected, clicked). As shown, in some implementations, the notifications shown in the notification window can include potential wager opportunities. The player can interact with one or more of the wagering actionable objects to place wagers. For example, a player may select actionable object 320 to increase the wager amount to wager $25 (changes to the wager amount can be shown in information object 318, which in FIG. 3A shows a $5 wager) and select actionable object 308 (e.g., wager the over). In another example, a player may select actionable object 324 to decrease the wager amount to wager $3 (changes to the wager amount can be shown in information object 318) and select actionable object 316 (e.g., wager the over). In some implementations, it should be understood that the presented notifications (e.g., shown in FIGS. 3A-3E) may be for one or more live events and the depictions of the notification window 304 in the live event broadcast 300A are purely example notifications, and other configurations including other content, such as notifications, alerts, messages, or information relating to live events are possible. Furthermore, in various implementations, it should be understood that a wager may be any asset of value such as, but not limited to, fiat currency, digital currency, cryptocurrency, credits (e.g., distributed by live event system 205), coupons, among others.

Additionally, the live event broadcast 300A can include information objects (e.g., 306, 312, 318, 322) that can be configured to provide content via display device 302. For example, the current wager amount is shown in the current wager amount field 318. In another example, wager information is shown in the current wager information fields 306, 312, and 322. It should be understood that the labels, elements, objects, locations, and depictions of the live event broadcast 300A are purely example interface elements, and other configurations including other content, such as depictions of live events (e.g., football, basketball, baseball, soccer, wrestling, fighting, online gaming) are possible. An interaction with the actionable objects can cause the broadcast receiver device 220 and/or client device 225 to transmit the indication and/or selection of one or more wagers to the live event system 205, as described herein. After which, a credit balance can be deducted.

Referring back now to FIG. 2, the device monitor 235 can access one or more messages that can include, but are not limited to, one or more wagers associated with one or more live events. The device monitor 235 can utilize one or more application programming interfaces (API) to access messages from the broadcast receiver devices 220 and/or broadcast provider system 215. In particular, the facilitation of communication can be implemented as an application programming interface (API) (e.g., REST API, Web API, customized API), batch files, SDK, and/or queries. In various implementations, the live event system 205 can also be configured to control access to resources of the live event system 205 and database 250.

One or more APIs can be used by the live event system 205 (e.g., in particular, the device monitor 235) and/or computing systems to exchange data and make function calls in a structured format. The API may be configured to specify an appropriate communication protocol using a suitable electronic data interchange (EDI) standard or technology. The EDI standard (e.g., messaging standard and/or supporting technology) may include any of a SQL data set, a protocol buffer message stream, an instantiated class implemented in a suitable object-oriented programming language, an XML file, a text file, an Excel file, a web service message in a suitable web service message format (e.g., representational state transfer (REST), simple object access protocol (SOAP), web service definition language (WSDL), JavaScript object notation (JSON), XML remote procedure call (XML RPC). As such, EDI messages may be implemented in any of the above or using another suitable technology. In some implementations, the communication session (e.g., via an API) can be established between the live event system 205 and broadcast provider system 215 and periodically (or in real-time) data received from the broadcast receiver devices 220 can be batched and sent to the live event system 205 using an EDI messages.

In some implementations, upon receiving a wager, the credit live event analyzer 240 can decrease a credit balance based on the wager. Decreasing the credit balance can include subtracting the wager amount from the total credits available to the account 255. If the wager amount exceeds the total credits available, the live event analyzer 240 can prompt the user to access more credits (e.g., via purchase, coupons, or using one or more codes that unlock credits, etc.). In some implementations, the live event can be a free-play mode, in which the user has unlimited credits (or can replenish the total credit amount indefinitely, etc.). The live event analyzer 240 can compare the wager amount to the credit balance of the account 255 to determine whether the wager amount exceeds the credit balance. If the credit balance is not exceeded, the live event analyzer 235 can execute the wager.

The live event analyzer 240 can analyze messages accessed by the live event monitor 235. The live event analyzer 240 may analyze messages (e.g., wagers, identifiers of live events, any other information in the messages, etc.) to determine if a notification generation policy for a live event has been satisfied. In some implementations, the notification generation policy can be a policy with one or more rules (e.g., thresholds, if/then, conditions). For example, the notification generation policy may be an uplift wager level that is satisfied when a certain number of messages (e.g., 10 wagers, 50 wagers, 150 wagers, 2,000 wagers, etc.) within a certain time frame (e.g., 30 seconds, 1 minute, 1 hour, 1 day, etc.) occur on a specific live event or a specific wager (e.g., over/under, money line, parlay, among others). In another example, the notification generation policy may be an event rule that is satisfied when a certain event occurs (e.g., half-time, 2 minutes before the fourth quarter, 3 minutes before the 2-minute warning, team V scores 50 points before team W score 30 points, player X scores 2 touchdowns in the first quarter, no scoring occurred in the first 45 minutes of a match, player Y is one homerun away from a cycle, player Z scored 10 points based on a fantasy (e.g., daily fantasy) scoring guide, etc. Such event rules may be specified in the event instructions 265. In some implementations, the live event analyzer 240 may access information relating to a live event (e.g., from a third-party data source (not pictured), from an internal database, from the broadcast provider system 215, etc.) that includes current status information for live events identified in wagers. For example, if the live event analyzer 240 detects a high-influx of wagers corresponding to a live event, the live event analyzer 240 may retrieve real-time information relating to the live event (e.g., event status information such as score, time remaining, or other information relating to critical events as described herein, etc.). This retrieved information may be used to update the event status in the play information 260 for the identified live event. Accordingly, it should be understood that the notification generation policy rules are purely examples, and other rules and/or policies can be implemented.

The live event analyzer 240 may utilize a table or set of rules to identify whether certain high-importance or critical events are about to occur. These may be referred to as critical event rules, which if satisfied for a particular event, may indicate that a critical moment in live content is about to occur. In response to detecting a live event, the live event system 205 may schedule a recording for the portion of the live event corresponding to the critical moment (e.g., if duration information for the critical moment is also identified), or may provide one or more notifications to various broadcast receiver devices, as described herein. Some example rules that may be used to identify an upcoming live event may include, for example, detecting conditions in social media messages (e.g., text that indicates an upcoming condition in the game, such as "tie game," or "close game," or information or tags that indicate little time is left in the live event, etc.).

In some implementations, critical moments may be detected when the game is at a particular state. For example, the live event analyzer may receive live event information from another computing device (not pictured) that indicates a status or state of the game, such as a time remaining in a quarter of a football game, a number of points left in a set of tennis, or a number of strikes or outs in an inning of a baseball game, or a number of seconds or minutes left in another type of sporting event. The information about the live event can also include an identifier of the type of live event, which may be associated in a table with a set of rules for the live event maintained by the live event system 205. Upon receiving an indication of a game status or state, the live event analyzer 240 can compare the game state information the corresponding rules of the live event to determine whether a potential game-changing event, or critical event, may occur soon. For example, if there are two outs in an inning of baseball, which can indicate that the inning may change soon, and therefore is an indicator of a critical event. Score information for the game may also be used to determine the presence of an upcoming critical event. The critical event rules may specify that if a game is close to a change in game state (e.g., close to end of game, close to end of inning, end of set, end of at-bat, free kicks, fouls, etc.), a critical event may be about to occur. In some implementations, the critical event rules may specify that if a game is close to a change in game state, and the score is close (e.g., within a predetermined difference, etc.), a critical event may occur.

As described herein, the critical event rules may also specify that a critical event is about to occur in a live event if there is an influx of messages, such as wagers or social media messages, corresponding to the live event. For example, the live event analyzer 240 may monitor various data sources, such as the broadcast receiver devices 220, the client devices 225, or servers, webpages, or other data repositories (not pictured) corresponding to social media services or other messaging services, to detect information (e.g., text, tags, or metadata) related to current live events (e.g., live events that are currently being broadcast). The live event analyzer 240 may access these sources of data, and compare the average number of messages to a baseline value for a particular live event to detect the presence of a critical event in the live event. For example, the live event analyzer 240 can maintain data records corresponding to various teams, sporting events, and other data, that indicate baseline levels of online activity related to particular live events (e.g., certain sporting events that include certain teams, certain types of games such as playoff games or the world series, certain players or participants in the live events, etc.). This baseline information may be monitored by the live event analyzer 240 over periods of time, or may be provided by a data source (not pictured) via the network 210. The live event analyzer 240 can compare the baseline value (which may be maintained or estimated based on historic activity), to the current volume of messages corresponding to the live event that have occurred across predetermined time windows that begin at the current time and extend backward by predetermined amounts. These time windows may correspond to various different baseline values. If the average number of messages that correspond to a live event exceed the baseline number of messages for that live event (or a historic live event having similar attributes, type, teams, players, or other similar information), the live event analyzer 240 can detect the presence of an upcoming critical event in the live event, for use in the techniques described herein.

In some implementations, the live event analyzer 240 can perform one or more analysis techniques on the broadcast content. For example, the live event analyzer 240 can execute one or more artificial intelligence models, such as convolutional neural network models or natural language processing models, to identify and extract various attributes of the broadcast content, including score information, game state information (e.g., teams involved in a live event, scores in the live event, time left in a live event, time-out events in the live event, etc.). The live event analyzer 240 can compare one or more of the attributes to one or more conditions that correspond to a critical event (e.g., scores being tied in the last moments of a quarter, etc.). In response to detecting that the portion of the live event corresponding to the critical moment is approaching, the live event analyzer 240 can generate instructions to record the portion of the live event corresponding to the critical event using the techniques described herein. The live event analyzer 240 can compare the game state information to various critical event rules to detect the presence of an upcoming critical event in the live event.

In various implementations, when a notification generation policy is satisfied, the live event analyzer 240 may communicate with (or inform) the device determiner 245 to identify a subset of broadcast receiver devices 220 that satisfy a notification transmission policy relating to the live event. In some implementations, the notification transmission policy can be a policy with one or more rules (e.g., conditions, protocols, lists). In particular, the notification transmission policy may include one or more rules associated with the player that indicate whether a display notification should be sent to a broadcast receiver device 220 associated with the player. For example, the notification transmission policy may identify if the player is currently watching TV (e.g., broadcast receiver device 220 is on). In another example, the notification transmission policy may include one or more attributes of the player profile that indicate the player is interested in the live event (e.g., does the player watch baseball). In yet another example, the notification transmission may indicate if the user traditionally wagers on the identified live event (e.g., from historical wager information in the player profile). In yet another example, the notification transmission may be a configuration of the player that indicates they want to receive notifications (e.g., toggle on or off in player settings). In yet another example, the notification transmission may indicate the player is currently watching the live event and thus a notification can be append to the notification window rather than requesting the player to switch to the broadcast of the live event. Accordingly, it should be understood that the notification transmission policy rules are purely examples, and other rules and/or policies can be implemented.

In various implementations, the live event communicator 230 can transmit instructions to the broadcast provider system 215 causing the broadcast provider system 215 to communicate with each broadcast receiver device 220 of the subset of broadcast receiver devices and cause each broadcast receiver device 220 of the subset to display a notification identifying the live event and corresponding to the condition of the notification generation policy. The live event communicator 230 can generate display instructions for the subset of broadcast receiver devices 220 that satisfy the notification transmission policy. The display instructions can include, for example, formatting instructions to position each of the actionable and information objects according to an arrangement of a notification window (e.g., absolute or relative positions of the actionable and information objects.). In addition, the instructions can include an indication that the actionable and information objects are to be presented with broadcast content displayed at the broadcast receiver device 220. As described herein above, the broadcast receiver devices 220 can receive broadcast content from a broadcast provider system 215, for example, via a proprietary broadcast network. In conventional broadcast systems, broadcast receiver devices 220 cannot display additional content according to customized arrangements or properties or attributes of the displayed broadcast content. The system 200 is an improvement over these conventional systems because the live event system 205 can generate instructions that cause an application executing on the broadcast receiver device 220 to display selected actionable and information objects in a notification window (or within a live-event window) to a customized arrangement at the same time as broadcast content.

In implementations where the broadcast receiver devices 220 are smart televisions that, the instructions can be received by an application executing on the smart television that displays the notifications in connection with the live events. In such implementations, the broadcast receiver devices 220 (e.g., the smart televisions) may receive a decoded content stream of live broadcast content from a cable box or set top box, and present the live broadcast content on a display of the smart television with a user interface of the application. Examples of live content being displayed in connection with such user interfaces are depicted in FIGS. 3A-3E. In implementations where the broadcast receiver devices 220 are cable boxes or set top boxes, the live event communicator 230 may communicate the instructions to the broadcast receiver device via the broadcast provider system 215, which itself can communicate the instructions to the subset of broadcast receiver devices 220 via a proprietary broadcast network. For example, The instructions generated by the live event communicator 230 can be received by the broadcast provider system 215, and can include indications or identifiers of the broadcast receiver devices 220 to which the display instructions are directed.

The live event communicator 230 can generate display instructions to include formatting instructions or other types of executable or computer-readable instructions that cause the broadcast receiver device 220 to display any of the application interfaces depicted in FIGS. 3A-3E, among other display features described herein. The display instructions can include the actionable and information objects, and one or more scripts that cause the actionable and information objects to be actionable, as described herein. In some implementations, to generate the display instructions, the live event communicator 230 can utilize one or more templates corresponding to a type of actionable and information objects (e.g., an actionable object that causes the broadcast receiver device 220 to place a wager on a live event, an actionable object that causes the broadcast receiver device 220 to navigate to another broadcast, an actionable object that causes the broadcast receiver device 220 to create or modify a fantasy sports lineup, etc.). To generate the instructions, live event communicator 230 can populate predetermined portions of the template with one or more of the selected actionable and information objects. In some implementations, the live event communicator 230 can generate the instructions based on a determined type of broadcast receiver device 220. For example, an application executing on a smart television may require a different type of instructions than a cable box, a set top box, or a cable box that receives a satellite signal via a satellite dish. To accommodate for different types of broadcast receiver devices 220, the live event communicator 230 can maintain sets of templates both for each actionable and information objects (e.g., types of interactions, types of content items or media content, etc.) and for each type of broadcast receiver device 220.

Once generated, the live event communicator 230 can transmit the display instructions to the broadcast receiver device 220, causing the broadcast receiver device 220 to display the notification window (e.g., actionable and information objects) according to the arrangement with the broadcast of the live event, similar to the displays in FIGS. 3A-3E. In some implementations, the live event communicator 230 can transmit the display instructions to the broadcast provider system 215. The instructions can include, for example, indications of the one or more broadcast receiver devices 220 that are to receive the display instructions. Upon receiving the display instructions from the live event communicator 230, the broadcast provider system 215 can identify the one or more broadcast receiver devices 220 (e.g., destinations) as indicated in the instructions, and transmit the display instructions to each of the destination broadcast receiver devices 220. The application executing on the broadcast receiver device 220 can receive the display instructions and identify the arrangement of the notification window, actionable and information objects to display with the live broadcast content. The application can then render the content in one or more application interfaces or overlays, such as those depicted in FIGS. 3A-3E. As described herein, the broadcast receiver device 220 can receive interactions from a player via one or more input devices, allowing for interaction with one or more actionable objects depicted as part of the notification window. Upon detecting an interaction, the broadcast receiver device 220 can parse or execute the display instructions for the selected actionable objects to carry out the designated action (e.g., transmit a request to place a wager, navigate to other broadcast content, update a fantasy sports lineup, etc.). It should be understood that any other functionality as described herein can be carried out by the broadcast receiver device 220 via the application or the display instructions.

Figure 3B:
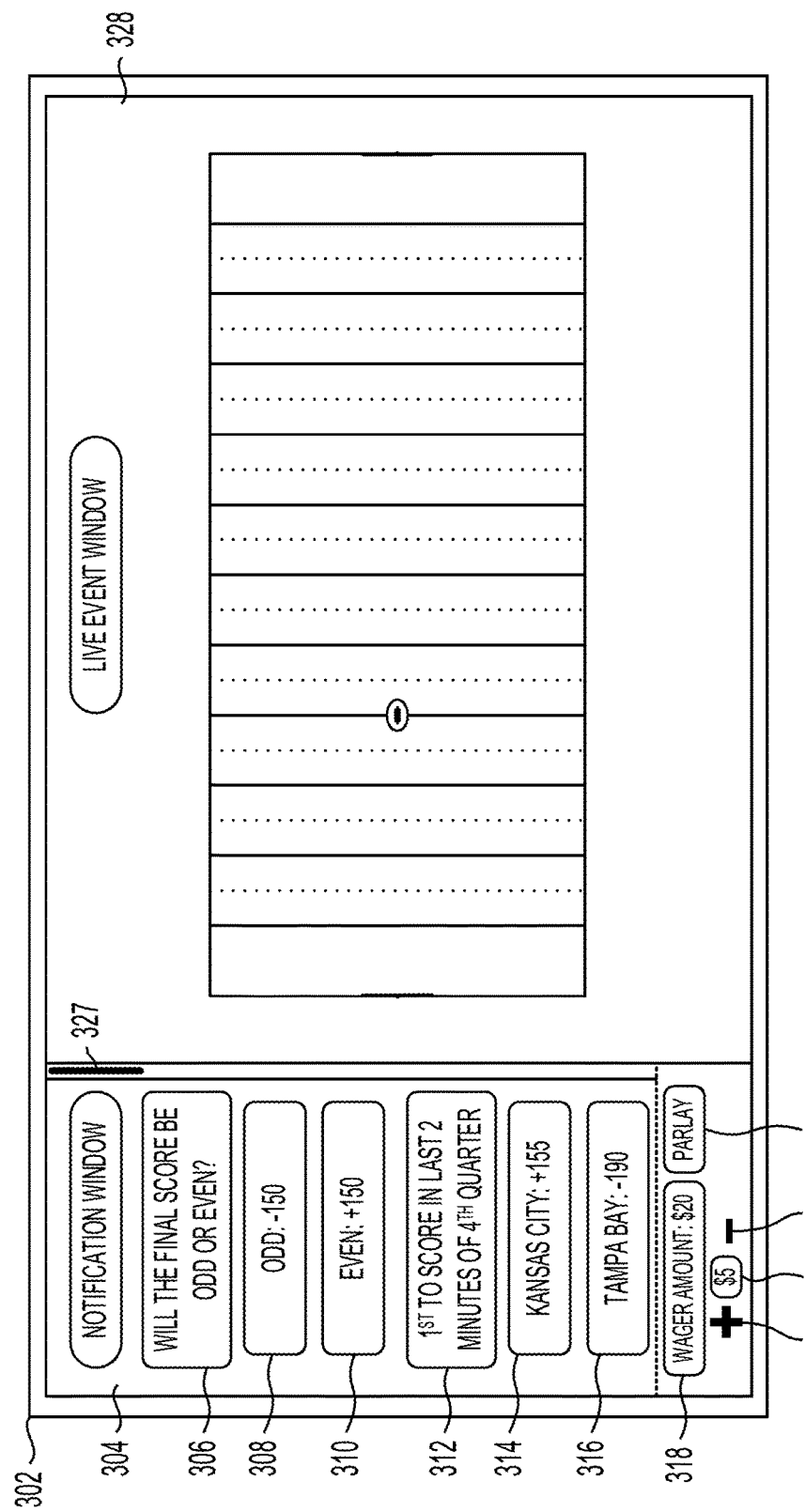

Referring now to FIG. 3B, depicted is an example live event broadcast 300B displayed on a broadcast device, such as the broadcast receiver device 220, the client device 225, or another computing device described herein. The live event broadcast 300B can include similar features and functionalities of FIG. 3A. The live event broadcast 300B can include a display device 302 that includes a live event window 328 and a notification window 304. The display device 302 may be a broadcast receiver device 220 and/or client device 225. In some implementations, the notification window 304 may be presented and the live event window 328 may be adjusted based on receiving instructions to display a notification identifying one or more live events and wager opportunities. In various implementations, the instructions may be received from the broadcast provider system 215 (e.g., via a cable distribution network or network 210) and/or from live event system 205 (e.g., via network 210).

As shown in the FIG. 3B, the live event broadcast 300B can include wagering actionable objects (e.g., 308, 310, 314, 316, 320, 322, 324, 326, 327) that can be interacted with (e.g., selected, clicked) depicting potentially wager opportunities. The player can interact with one or more of the wagering actionable objects to place wagers. For example, a player may select actionable object 326 to parlay at least two wagers (e.g., selecting two actionable object, such as, 308 and 314). In another example, a player may select actionable object 316 for a first wager and scroll, using actionable object 327 to identify another actionable object to select for a second wager. To place a wager, the broadcast receiver device (e.g., the broadcast receiver device 220) can communicate with the live event system 205 to update a corresponding account 255 to indicate the wager, or may communicate with another computing device (not pictured) responsible for managing wagers on live events.

Additionally, the live event broadcast 300B can include information objects (e.g., 306, 312, 318, 322) that can be configured to provide content via display device 302. It should be understood that the labels, elements, objects, locations, and depictions of the live event broadcast 300B are purely example interface elements, and other configurations including other content, such as depictions of live events (e.g., football, basketball, baseball, soccer, wrestling, fighting, online gaming) are possible. An interaction with the actionable objects can cause the broadcast receiver device 220 and/or client device 225 to transmit the indication and/or selection of one or more wagers to the live event system 205, as described herein. After which, a credit balance can be deducted.

Figure 3C:
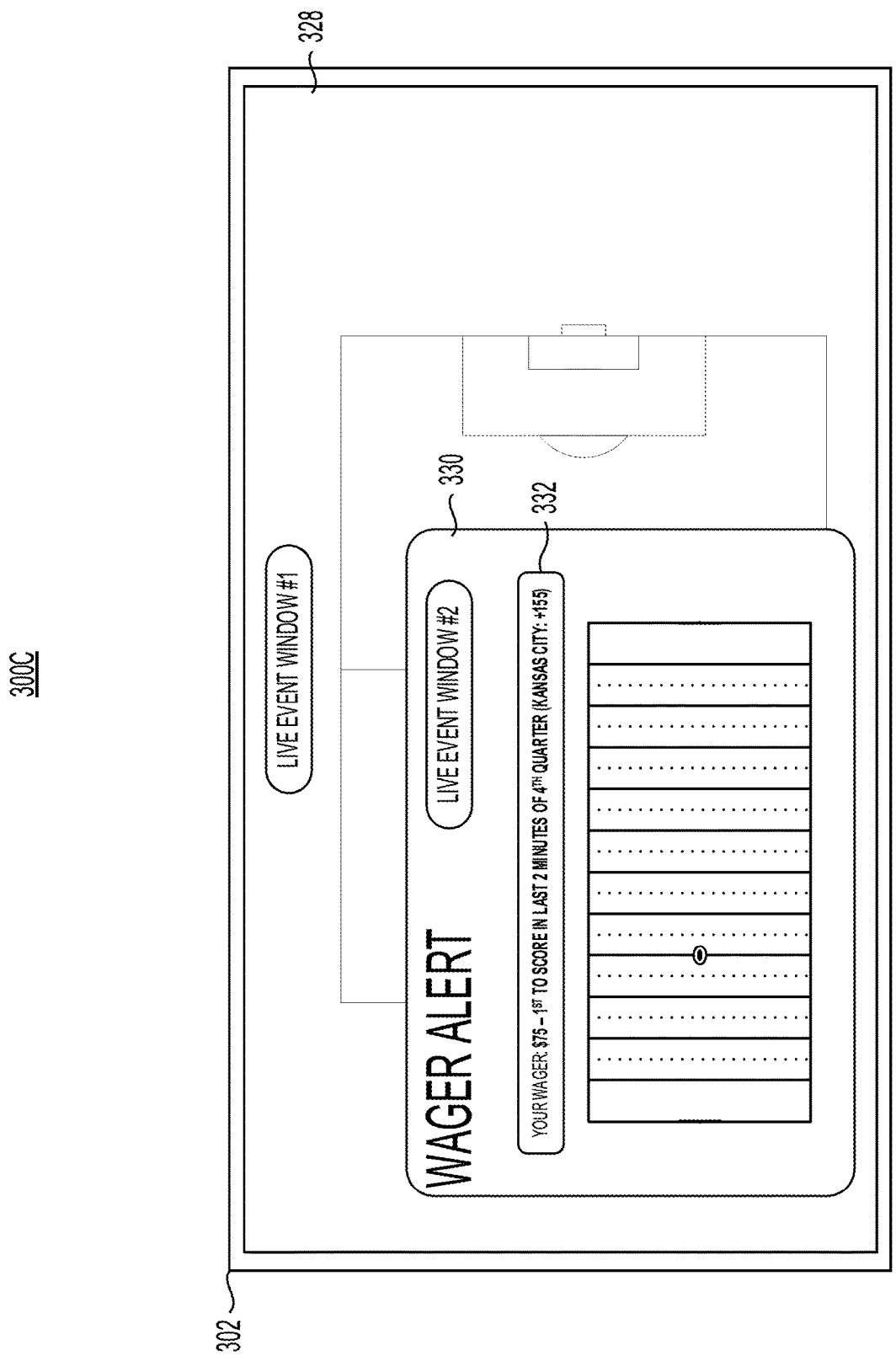

Referring now to FIG. 3C, depicted is an example live event broadcast 300C displayed on a broadcast device, such as the broadcast receiver device 220, the client device 225, or another computing device described herein. The live event broadcast 300C can include similar features and functionalities of FIG. 3A. The live event broadcast 300C can include a display device 302 that includes a first live event window 328 and a second live event window 330. The display device 302 may be a broadcast receiver device 220 and/or client device 225. In some implementations, the second live event window 330 may be presented over (or within) the first live event window 328 and display a notification (or alert) identifying one or more live events and one or more alerts (or wager opportunities). In particular, the live event system 205 can instruct the broadcast provider system 215 to provide picture-in-picture capabilities to show two or more live events in a single window. For example, if a player wagers on nine different football games, the live event system 205 may instruct the broadcast provider system to provide picture-in-picture capabilities to show all nine football games in a single picture (or window). In various implementations, the instructions may be received from the broadcast provider system 215 (e.g., via a cable distribution network or network 210) and/or from live event system 205 (e.g., via network 210).

As shown in the FIG. 3C, the live event broadcast 300C can include wagering actionable objects (e.g., 332) that can be interacted with (e.g., selected, clicked) depicting previous wagers. The player can interact with one or more of the wagering actionable objects to present (e.g., in full-screen of the second live event window 330, split-screen live event windows 328 and 330) a live event where the player previously wagered. For example, a player may select actionable object 332 to view the Kansas City football game they previously wagered on. As shown, the actionable object 322 can include various information regarding the previous wager.

Additionally, it should be understood that the labels, elements, objects, locations, and depictions of the live event broadcast 300C are purely example interface elements, and other configurations including other content, such as depictions of live events (e.g., football, basketball, baseball, soccer, wrestling, fighting, online gaming) are possible. An interaction with the actionable objects can cause the broadcast receiver device 220 and/or client device 225 to transmit the indication and/or selection of one or more wagers to the live event system 205, as described herein. After which, a credit balance can be deducted.

Referring now to FIG. 3D, depicted is an example live event broadcast 300D displayed on a broadcast device, such as the broadcast receiver device 220, the client device 225, or another computing device described herein. The live event broadcast 300D can include similar features and functionalities of FIG. 3A. The live event broadcast 300D can include a display device 302 that includes a live event window 328. The display device 302 may be a broadcast receiver device 220 and/or client device 225. In some implementations, a notification may be presented (or overlayed) within live event window 328 based on receiving instructions to display a notification identifying one or more live events and wager opportunities. In various implementations, the notification may be for the live event currently viewed and presented in live event window 328. Alternatively, the notification may be for a different live event not currently presented in live event window 328. The instructions to present the notification and one or more actionable objects can be received from the broadcast provider system 215 (e.g., via a cable distribution network or network 210) and/or from live event system 205 (e.g., via network 210).

As shown in the FIG. 3D, the live event broadcast 300D can include wagering actionable objects (e.g., 336, 338, 340) that can be interacted with (e.g., selected, clicked) depicting potentially wager opportunities. The player can interact with one or more of the wagering actionable objects to place wagers. For example, a player may select actionable object 336 to wager (e.g., $25, 1 Bitcoin, 5 credits) that more than 1.5 runs will be scored in the last 4 innings of a baseball game (e.g., live event), with a payout based on a probability value (e.g., +290). In another example, a player may select actionable object 340 to wager that more than 3.5 runs will be scored in the last 4 innings of a baseball game, with a payout based on a probability value (e.g., 120).

Additionally, the live event broadcast 300D can include information objects (e.g., 334) that can be configured to provide content via display device 302. It should be understood that the labels, elements, objects, locations, and depictions of the live event broadcast 300D are purely example interface elements, and other configurations including other content, such as depictions of live events (e.g., football, basketball, baseball, soccer, wrestling, fighting, online gaming) are possible. An interaction with the actionable objects can cause the broadcast receiver device 220 and/or client device 225 to transmit the indication and/or selection of one or more wagers to the live event system 205, as described herein. After which, a credit balance can be deducted.

Referring now to FIG. 3E, depicted is an example live event broadcast 300E displayed on a broadcast device, such as the broadcast receiver device 220, the client device 225, or another computing device described herein. The live event broadcast 300E can include similar features and functionalities of FIG. 3A. The live event broadcast 300E can include a display device 302 that includes a live event window 328. The display device 302 may be a broadcast receiver device 220 and/or client device 225. In some implementations, a notification may be presented (or overlayed) within live event window 328 based on receiving instructions to display a notification identifying one or more live events and wager opportunities. In various implementations, the notification (e.g., wager alert, wager opportunity) may be for a live event. The instructions to present the notification and one or more actionable objects can be received from the broadcast provider system 215 (e.g., via a cable distribution network or network 210) and/or from live event system 205 (e.g., via network 210).

As shown in the FIG. 3E, the live event broadcast 300E can include wagering actionable objects (e.g., 342) that can be interacted with (e.g., selected, clicked) depicting potential wager opportunities. The player can interact with one or more of the wagering actionable objects to place wagers and/or switch the live event window 328 to a different live event. For example, a player may select actionable object 342 to switch the live event window 328 to a different live event with a potential wager opportunity (e.g., close game, 2 minutes before the fourth quarter, any policy). When interacted with, the actionable object 342 can cause the broadcast receiver device 220, or an application executing on the broadcast receiver device 220, to request a broadcast of the different live event from the broadcast provider system 215.

Additionally, it should be understood that the labels, elements, objects, locations, and depictions of the live event broadcast 300E are purely example interface elements, and other configurations including other content, such as depictions of live events (e.g., football, basketball, baseball, soccer, wrestling, fighting, online gaming) are possible. An interaction with the actionable objects can cause the broadcast receiver device 220 and/or client device 225 to transmit the indication and/or selection of one or more wagers to the live event system 205, as described herein. After which, a credit balance can be deducted.

Figure 4:
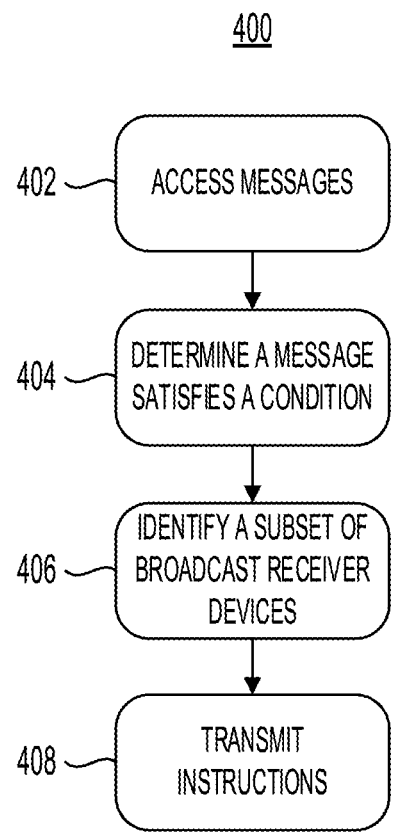
FIG. 4 illustrates an example flow diagram of a method for providing live event system functionalities, in accordance with one or more implementations.

Referring now to FIG. 4, depicted is an illustrative flow diagram of a method 400 for providing notification during live events. The method 400 can be executed, performed, or otherwise carried out by the live event system 205, the computer system 100 described herein in conjunction with FIGS. 1A-1D, or any other computing devices described herein. In brief overview of the method 400, the live event system (e.g., the live event system 205, etc.) can access messages (STEP 402), determine message satisfies a condition (STEP 404), identify a subset of broadcast receiver devices (STEP 406), and transmit instructions (STEP 408).

In further detail of the method 400, the live event system (e.g., the live event system 205, etc.) can access, from one or more content sources, one or more messages associated with a live event broadcasted to one or more broadcast receiver devices via a broadcast provider system (e.g., the broadcast provider system 215 and/or broadcast receiver device 220) (STEP 402). The messages can include one or more wagers and accessing the plurality of messages can include receiving the plurality of wagers that identify the live event. In some implementations, the messages may include device identifiers and/or account information identifying the origin of the messages (e.g., client devices 225, broadcast receiver devices 220). Additionally, the messages may include live event information such as statistics of the live event. The one or more content sources can include data collected from broadcast receiver devices 220, client devices 225, broadcast provider systems 215, third-party sources (e.g., content providers), and/or any other computing devices described herein.

The live event system can determine that at least one message of the plurality of messages satisfies a condition of a notification generation policy relating to the live event (STEP 404). In some implementations, determining that at least one message of the plurality of messages satisfies the condition of the notification generation policy further includes determining that a number of the plurality of messages associated with the live event satisfies a predetermined threshold. For example, after receiving 15 messages (e.g., predetermined threshold is 15 messages) for a football game the notification generation policy is satisfied.

In various implementations, determining that at least one message of the plurality of messages satisfies the condition of the notification generation policy further includes determining that a type of wager indicated in at least one message satisfies a predetermined wager type condition. That is, a type of wager can include, but is not limited to, money line bets, straight bets, proposition (or prop) bets, teaser bets, among others. For example, upon receiving 100 messages with a money line bet (e.g., predetermined threshold is 100 money line bets) for a particular team and/or for the particular game the notification generation policy is satisfied.

In some implementations, determining that at least one message of the plurality of messages satisfies the condition of the notification generation policy further includes determining that at least one message indicates a wager amount that satisfies a predetermined wager amount condition. For example, after receiving a wager of $250 or greater (e.g., predetermined threshold is $250 or greater) for a soccer game the notification generation policy is satisfied. In another example, after receiving a wager of $250 or less (e.g., predetermined threshold is $250 or less) for a basketball game the notification generation policy is satisfied.

The live event system can identify, from the plurality of broadcast receiver devices, a subset of broadcast receiver devices that satisfy a notification transmission policy relating to the live event (STEP 406). In some implementations, the live event system can maintain one or more user profiles (or accounts, e.g., accounts 255) corresponding to user consuming (or using) a service of the one or more processors. Each of the plurality of user profiles can be associated with a respective one of the plurality of broadcast receiver devices. The live event system can determine a subset of broadcast receiver devices based on one or more attributes of each user profile of the plurality of user profiles. In particular, a broadcast receiver device can be part of the subset of broadcast receiver devices based on satisfying notification transmission policy. For example, if player X is currently watching TV on a broadcast receiver device X, player Y is currently watching TV on broadcast receiver device Y, but player Z is not currently watching TV (even though it may have satisfied the notification generation policy), broadcast receiver device X and broadcast receiver device Y may be included in the subset of broadcast receiver devices, and broadcast receiver device Z may be excluded.

The live event system can transmit instructions to the broadcast provider system, instructions causing the broadcast provider system to communicate with each broadcast receiver device of the subset of broadcast receiver devices and cause each broadcast receiver device of the subset to display a notification identifying the live event and corresponding to the condition of the notification generation policy (STEP 408). As shown in FIGS. 3A-3E, the instructions can include various styling information and wager information that can cause the display device (e.g., the broadcast receiver device 220 and/or client device 225) to display various windows and/or notifications described above. In some implementations, the notification can include an actionable object that causes a broadcast receiver device displaying the notification to display a broadcast of the live event.

In various implementations, the notification can include an actionable object identifying the live event that, when actuated, causes a broadcast receiver device displaying the notification to display a second content item with a broadcast of the live event. For example, as shown with reference to FIG. 3C, the broadcast of the live event can be overlayed (or styled within) the current live event window. In some implementations, the notification can include an actionable object identifying the condition of the notification generation policy that, when actuated, causes a broadcast receiver device displaying the notification to transmit a request to place a wager on the live event. For example, upon selecting a wager such as an over/under, money line, prop, parlay, among others, the live event system can receive the wager and store the wager in a database (e.g., the database 250, in event dataset 265).

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus", "data processing system", "client device", "computing platform", "computing device", or "device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a GUI or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the live event system 205 can include clients and servers. For example, the live event system 205 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice-versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the live event system 205 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including one or more these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for providing notifications of critical events based on activity data corresponding to live broadcasts, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A method, comprising:
  accessing, by one or more processors coupled to memory, a content source that maintains a plurality of messages;
  determining, by the one or more processors, based on the plurality of messages accessed via the content source, an increase in a volume of a subset of the plurality of messages that identify a first live event by a determined amount within a first time window relative to a baseline time window;
  determining, by the one or more processors, that the increase in the volume of the subset of the plurality of messages that identify the first live event by the determined amount within the first time window satisfies a notification generation threshold;
  receiving, by the one or more processors, a request for content from a broadcast receiver device that is presenting a broadcast of a second live event;
  selecting, by the one or more processors, a content item that identifies the first live event based on the increase in the volume satisfying the notification generation threshold; and
  responsive to the request for content and responsive to determining that the increase in the volume of the subset of the plurality of messages that identify the first live event by the determined amount within the first time window satisfies the notification generation threshold, transmitting, by the one or more processors, instructions to the broadcast receiver device, the instructions configured to cause the broadcast receiver device to display the content item identifying the first live event and including an actionable object that, when interacted with, causes the broadcast receiver device to navigate to a broadcast of the first live event.

2. The method of claim 1, wherein determining that the notification generation threshold is satisfied is further based on a change in odds associated with the first live event.

3. The method of claim 2, wherein determining that the change in odds satisfies the notification generation threshold further comprises determining, by the one or more processors, that the change in odds is greater than a predetermined threshold.

4. The method of claim 1, further comprising maintaining, by the one or more processors, a plurality of user profiles, each user profile of the plurality of user profiles corresponding to a respective user consuming a service of the one or more processors, each of the plurality of user profiles associated with a respective one of a plurality of broadcast receiver devices.

5. The method of claim 4, further comprising identifying, by the one or more processors, the broadcast receiver device from the plurality of broadcast receiver devices based on the request and one or more attributes of each user profile of the plurality of user profiles.

6. The method of claim 1, wherein the plurality of messages comprises a plurality of wagers, and wherein accessing the plurality of messages further comprises receiving, by the one or more processors, the plurality of wagers that identify the first live event.

7. The method of claim 6, wherein receiving the plurality of wagers comprises receiving, by the one or more processors, the plurality of wagers that satisfy a predetermined wager type condition.

8. The method of claim 1, wherein the plurality of messages comprises a plurality of social media posts, and wherein accessing the plurality of messages further comprises retrieving, by the one or more processors, the plurality of social media posts that identify the first live event.

9. The method of claim 1, wherein the content item further comprises a second actionable object identifying the second live event that, when interacted with, causes the broadcast receiver device to display a second content item with the broadcast of the second live event.

10. The method of claim 1, wherein the content item further comprises a second actionable object that, when interacted with, causes the broadcast receiver device to transmit, to the one or more processors, a request to place a wager on the first live event.

11. A system, comprising:
one or more processors coupled to a non-transitory memory, the one or more processors configured to:
access a content source that maintains a plurality of messages;
determine, based on the plurality of messages accessed via the content source, an increase in a volume of a subset of the plurality of messages that identify a first live event by a determined amount within a first time window relative to a baseline time window;
determine that the increase in the volume of the subset of the plurality of messages that identify the first live event by the determined amount within the first time window satisfies a notification generation threshold;
receive a request for content from a broadcast receiver device that is presenting a broadcast of a second live event;
select a content item that identifies the first live event based on the change in the volume of the subset of the plurality of messages that identify the first live event satisfying the notification generation threshold; and
responsive to the request for content and responsive to determining that increase in the volume of the subset of the plurality of messages that identify the first live event by the determined amount within the first time window satisfies the notification generation threshold is satisfied, transmit instructions to the broadcast receiver device, the instructions configured to cause the broadcast receiver device to display the content item identifying the first live event and including an actionable object that, when interacted with, causes the broadcast receiver device to navigate to a broadcast of the first live event.

12. The system of claim 11, wherein the one or more processors are further configured to determine that the notification generation threshold is satisfied further based on a change in odds associated with the first live event.

13. The system of claim 12, wherein the one or more processors are further configured to determine that the change in odds satisfies the notification generation threshold by performing operations comprising determining that the change in odds is greater than a predetermined threshold.

14. The system of claim 11, wherein the one or more processors are further configured to maintain a plurality of user profiles, each user profile of the plurality of user profiles corresponding to a respective user consuming a service of the one or more processors, each of the plurality of user profiles associated with a respective one of a plurality of broadcast receiver devices.

15. The system of claim 14, wherein the one or more processors are further configured to identify the broadcast receiver device from the plurality of broadcast receiver devices based on the request and one or more attributes of each user profile of the plurality of user profiles.

16. The system of claim 11, wherein the plurality of messages comprises a plurality of wagers, and wherein the one or more processors are further configured to access the plurality of messages by performing operations comprising receiving the plurality of wagers that identify the first live event.

17. The system of claim 16, wherein the one or more processors are further configured to receive the plurality of wagers by performing operations comprising receiving the plurality of wagers that satisfy a predetermined wager type condition.

18. The system of claim 11, wherein the plurality of messages comprises a plurality of social media posts, and wherein the one or more processors are further configured to access the plurality of messages by performing operations comprising retrieving the plurality of social media posts that identify the first live event.

19. The system of claim 11, wherein the content item further comprises a second actionable object identifying the first live event that, when interacted with, causes the broadcast receiver device to display a second content item with the broadcast of the second live event.

20. The system of claim 11, wherein the content item further comprises a second actionable object that, when interacted with, causes the broadcast receiver device to transmit, to the one or more processors, a request to place a wager on the first live event.

* * * * *